(12) United States Patent
Szilagyi et al.

(10) Patent No.: US 11,792,701 B2
(45) Date of Patent: Oct. 17, 2023

(54) TERMINAL DEVICE SPECIFIC HANDOVER PARAMETERS

(71) Applicant: NOKIA TECHNOLOGIES OY, Espoo (FI)

(72) Inventors: Peter Szilagyi, Budapest (HU); Csaba Vulkán, Budapest (HU)

(73) Assignee: NOKIA TECHNOLOGIES OY, Espoo (FI)

( * ) Notice: Subject to any disclaimer, the term of this patent is extended or adjusted under 35 U.S.C. 154(b) by 23 days.

(21) Appl. No.: 16/764,159

(22) PCT Filed: Nov. 16, 2017

(86) PCT No.: PCT/EP2017/079452
§ 371 (c)(1),
(2) Date: May 14, 2020

(87) PCT Pub. No.: WO2019/096389
PCT Pub. Date: May 23, 2019

(65) Prior Publication Data
US 2020/0396658 A1 Dec. 17, 2020

(51) Int. Cl.
*H04W 4/00* (2018.01)
*H04W 36/00* (2009.01)
(Continued)

(52) U.S. Cl.
CPC ... *H04W 36/0085* (2018.08); *H04W 36/0016* (2013.01); *H04W 36/0058* (2018.08);
(Continued)

(58) Field of Classification Search
CPC ......... H04W 36/0016; H04W 36/0058; H04W 36/0079; H04W 36/00835;
(Continued)

(56) References Cited

U.S. PATENT DOCUMENTS

| | | | |
|---|---|---|---|
| 2010/0234027 A1* | 9/2010 | Han | H04W 36/00835 455/436 |
| 2013/0084871 A1* | 4/2013 | Kitaji | H04W 36/0085 455/436 |

(Continued)

FOREIGN PATENT DOCUMENTS

| | | |
|---|---|---|
| EP | 2 728 937 A1 | 5/2014 |
| GB | 2 511 860 A | 9/2014 |

OTHER PUBLICATIONS

International Search Report & Written Opinion dated May 8, 2018 corresponding to International Patent Application No. PCT/EP2017/079452.

(Continued)

*Primary Examiner* — Matthew W Genack
(74) *Attorney, Agent, or Firm* — SQUIRE PATTON BOGGS (US) LLP

(57) ABSTRACT

There is provided a method in a cellular communication network, the method comprising: upon detecting that a terminal device has or is going to have a mobility condition previously determined to be associated with a handover anomaly or failure, determining terminal device specific handover parameters for said terminal device to avoid said handover anomaly or failure; and causing utilizing said terminal device specific handover parameters in one or more handovers associated with the terminal device.

17 Claims, 10 Drawing Sheets

(51) Int. Cl.
H04W 36/30 (2009.01)
H04W 36/32 (2009.01)
(52) U.S. Cl.
CPC . *H04W 36/0079* (2018.08); *H04W 36/00835* (2018.08); *H04W 36/00837* (2018.08); *H04W 36/30* (2013.01); *H04W 36/32* (2013.01)
(58) Field of Classification Search
CPC ....... H04W 36/00837; H04W 36/0085; H04W 36/30; H04W 36/32
See application file for complete search history.

(56) References Cited

U.S. PATENT DOCUMENTS

2016/0198370 A1* 7/2016 Watanabe ......... H04W 36/0061
455/436
2016/0360465 A1 12/2016 Kapoulas et al.

OTHER PUBLICATIONS

International Preliminary Report on Patentability dated Feb. 12, 2020 corresponding to International Patent Application No. PCT/EP2017/079452.

* cited by examiner

TERMINAL DEVICE SPECIFIC HANDOVER PARAMETERS

TECHNICAL FIELD

The invention relates to communications.

BACKGROUND

In a communication network, handovers between cells are used to enable devices to have service within the coverage area of the communication network. In some instances, handovers may fail or may cause certain unwanted anomalies, such as ping-pongs, short stays, and remote cell handover anomalies. Therefore, it may be beneficial to develop solutions which enable reducing said handover failures and anomalies.

US 2016/360465 discloses a method that includes determining a mobility speed group assignment for a mobile communication device having a radio resource control connection with a wireless network where the mobility speed group assignment is selected from among a plurality of mobility speed groups according to a speed of the mobile communication device, determining a cell size for a serving cell of the wireless network that is providing the radio resource control connection, and selecting a handover policy based on the mobility speed group assignment and the cell size.

GB 2511860 discloses a method for controlling data service for a user of a telecommunication network, the method comprising: retrieving data associated with historical behaviour for instance, cell connections, cell measurements, or requested data services of the user within the network; predicting, based on said data and on a current user location within the network, a future user location within the network; performing a determination of network capability at the future user location; and modifying, in response to the determination, a configuration of the network and/or a service parameter associated with the user. The modifying step may be performed in accordance with a user profile, or based on a requested data service. A series of future locations may be predicted, and a probable route between the current and future locations calculated. Deviations from the predicted route may be detected, which may lead to recalculation of the predicted route. Instructions may be provided to a base station, particularly if the predicted future location is a white spot, thus allowing the effects of the white spot to be somewhat mitigated. This may include tilt adjustment of the base station, beam steering, traffic steering, or increasing the transmit power of the base station.

US 2013/084871 discloses a radio base station comprising: a storage unit configured to store a handover parameter for controlling handover of radio terminals, in association with moving velocity information indicating a moving velocity of a given radio terminal; and a controller configured to detect handover failure and control the storage unit to adjust the handover parameter associated with the moving velocity information indicating a failure-detected moving velocity being a moving velocity of a radio terminal to which the handover failure is detected.

BRIEF DESCRIPTION

According to an aspect, there is provided an apparatus for a base station of a cellular communication network, the apparatus comprising: at least one processor; and at least one memory including computer program code, the at least one memory and the computer program code configured to, with the at least one processor, cause the apparatus at least to perform operations comprising: upon detecting that a terminal device has or is going to have a trajectory previously determined to be associated with a handover anomaly or failure, determining terminal device specific handover parameters for said terminal device to avoid said handover anomaly or failure; collecting handover data correlated with mobility data of a plurality of terminal devices; determining, based on the collected data, one or more trajectories associated with one or more handover anomalies or failures; monitoring mobility and/or cellular connectivity of terminal devices; causing utilizing said terminal device specific handover parameters in one or more handovers associated with the terminal device; monitoring the one or more handovers performed on the basis of said terminal device specific handover parameters; and based on the monitoring, if said handover anomaly or failure is avoided by utilizing said terminal device specific handover parameters, storing an indication about said terminal device specific handover parameters avoiding said handover anomaly or failure with respect to said trajectory.

According to an aspect, there is provided an apparatus of a cellular communication network, the apparatus comprising: at least one processor; and at least one memory including computer program code, the at least one memory and the computer program code configured to, with the at least one processor, cause a terminal device at least to perform operations comprising: performing one or more cell measurements; transmitting, based on said one or more cell measurements, one or more measurement reports to the cellular communication network for determining handover parameters; and utilizing terminal device specific handover parameters in one or more handovers associated with the terminal device to avoid a handover anomaly or failure, wherein the terminal device specific handover parameters are determined based on detecting that the terminal device has or is going to have a trajectory previously determined to be associated with the handover anomaly or failure and based on that said terminal device specific handover parameters have avoided said handover anomaly or failure with respect to said trajectory The scope of protection sought for various embodiments of the invention is set out by the appended independent claims. The embodiments, examples and features, if any, described in this specification that do not fall under the scope of the independent claims are to be interpreted as examples useful for understanding various embodiments of the invention.

BRIEF DESCRIPTION OF DRAWINGS

In the following some embodiments will be described with reference to the attached drawings, in which.

DETAILED DESCRIPTION OF SOME EMBODIMENTS

Figure 1A:
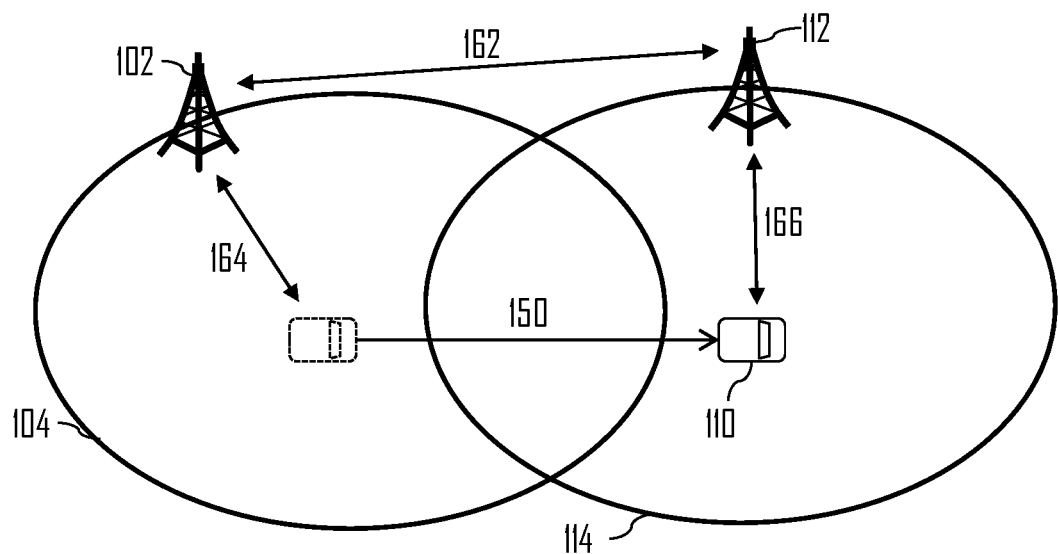
FIGS. 1A, 1B, and 1C illustrate some examples of cellular communication system to which embodiments of the invention may be applied.

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as in at least one of the following: Worldwide Interoperability for Micro-wave Access (WiMAX), Global System for Mobile communications (GSM, 2G), GSM EDGE radio access Network (GERAN), General Packet Radio Service (GPRS), Universal Mobile Telecommunication System (UMTS, 3G) based on basic wideband-code division multiple access (W-CDMA), high-speed packet access (HSPA), Long Term Evolution (LTE), and/or LTE-Advanced.

The embodiments are not, however, restricted to the system given as an example but a person skilled in the art may apply the solution to other communication systems provided with necessary properties. Another example of a suitable communications system is the 5G concept. 5G is likely to use multiple input-multiple output (MIMO) techniques (including MIMO antennas), many more base stations or nodes than the LTE (a so-called small cell concept), including macro sites operating in co-operation with smaller stations and perhaps also employing a variety of radio technologies for better coverage and enhanced data rates. 5G will likely be comprised of more than one radio access technology (RAT), each optimized for certain use cases and/or spectrum. 5G mobile communications will have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility. It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or cloud data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

Figure 1B:
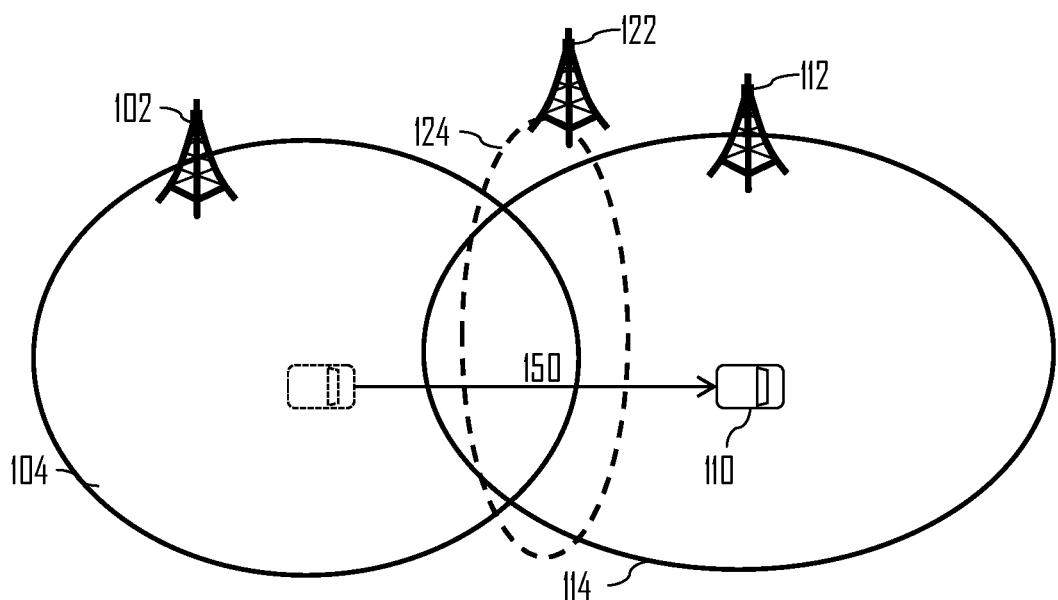
Figure 1C:
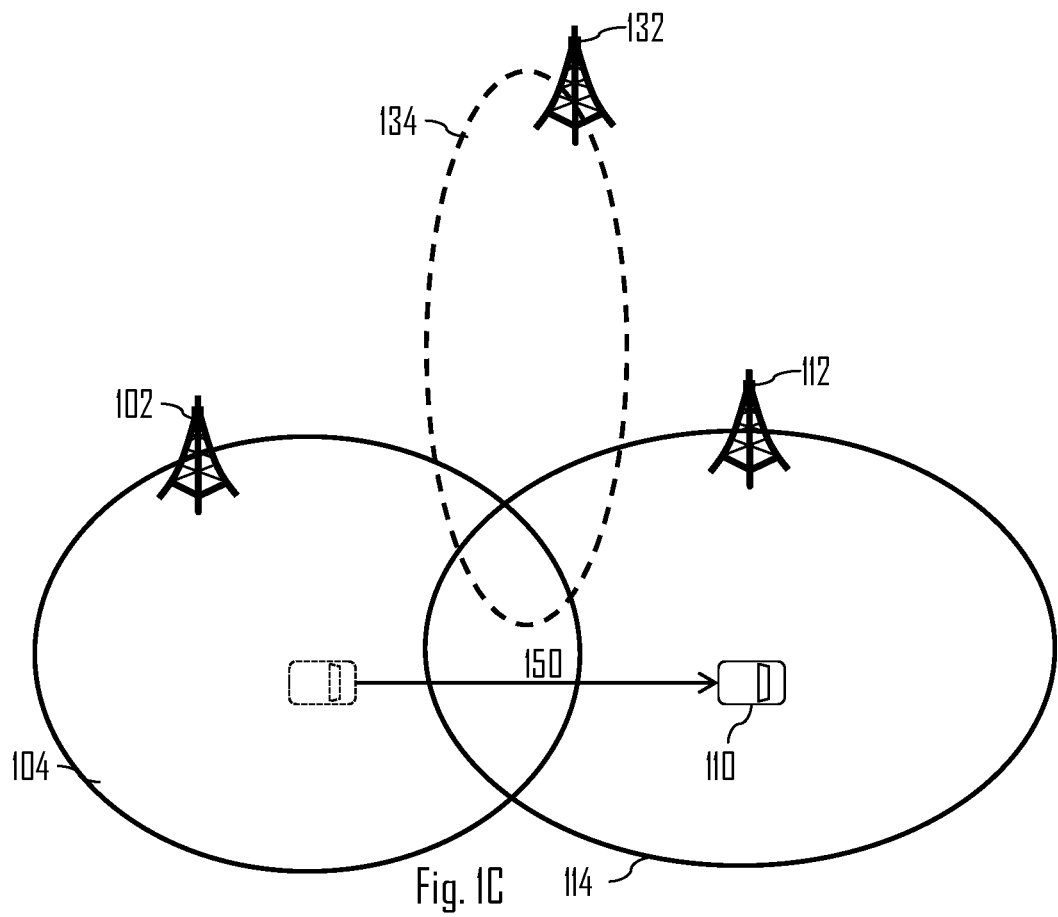

FIGS. 1A, 1B, and 1C illustrate examples of a radio communication system to which some embodiments may be applied. The radio communication system may comprise a cellular communication system or may be a cellular communication system. Such cellular communication system may enable communication according to one or more cellular communication protocols, such as the Long Term Evolution (LTE), the LTE-Advanced (LTE-A), the LTE-Advanced Pro of the 3rd Generation Partnership Project (3GPP), or the 5G solutions (i.e. New Radio (NR)). However, the cellular communication system may additionally utilize techniques, such as Wireless Local Area Network (WLAN) (i.e. sometimes referred to as WiFi), e.g. for offloading. Cellular communication networks, such as the ones depicted in FIGS. 1A to 1C are typically composed of at least one network element, such as a network element 102, providing a cell 104. The cell 104 may be, e.g., a macro cell, a micro cell, femto, or a pico-cell, for example. The network element 102 may be an evolved Node B (eNB) as in the LTE and LTE-A, a radio network controller (RNC) as in the UMTS, a base station controller (BSC) as in the GSM/GERAN, gNB as in the 5G, or any other apparatus capable of controlling radio communication and managing radio resources within the cell 104. The network element 102 may be referred to as a base station or an access node, for example. Also, it is possible that the network element 102 provides more than one cell (i.e. two or more cells). As virtualization of the cellular communication systems advances, the cells of the communication network may be controlled by a server or servers utilizing one or more Remote Radio Heads (RRHs). That is, computing and decision making may be performed in one or more virtual or physical servers which control one or more RRHs at the field, for example.

Network element(s) of the cellular communication network may each provide one or more cells for providing radio resources to one or more terminal devices 110. A terminal device may also be referred to as User Equipment (UE) as. As described, the functionality of the network element may be realized in many different ways: e.g. utilizing one physical entity configured to perform all tasks of the network element or utilizing two or more entities configured to interact with each other and provide the functionality of said network element.

The cellular communication networks may be composed of network nodes or elements similar to the network element 102, each network node or element controlling a respective cell or cells. For example, the cellular communication network may comprise a plurality of network elements providing cells and service for a certain area. The network elements may be connected to each other such that data transfer between the network elements is possible. For example, X2-interface between eNBs may be utilized. For example, Xx-interface between gNBs (or gNodeB) may be utilized. However, other solutions may also be possible (e.g. wireless data transfer or some other communication technique). It is also pointed out that not all network elements and/or cells of the cellular communication network necessarily are similar or same, but may wary between implementations. Hence, the cellular communication network may be a heterogeneous network comprising one or more macro and one or more femto cells. Further, the network elements of the cellular communication network may be connected via a core network interface to a core network of the cellular communication network or system. In an embodiment, the core network is called Evolved Packet Core (EPC) according to the LTE terminology. The core network may comprise a mobility management entity (MME), Home Subscriber Server (HSS), Application Server (AS) and a data routing network element. In the context of the LTE, the MME may track mobility of terminal devices 110, and carries out establishment of bearer services between the terminal devices 110 and the core network. In the context of the LTE, the data routing network element may be called a System Architecture Evolution Gateway (SAE-GW). It may be configured to carry out packet routing to/from the terminal devices 110 from/to other parts of the cellular communication network and to other systems or networks, e.g. the Internet. It needs to be understood that similar entities may be used with different communication solutions, such as 5G, but different terms may be used. E.g. MME may or may not be called MME in 5G. However, a similar entity or interacting entities performing similar functions may still be used.

With reference to FIGS. 1A to 1C, UE 110 or UEs may in communication (i.e. one or more communication links between the entities) with the cellular communication network as it is known in the art. Communication may comprise unicast, broadcast, multicast, bidirectional communication and unidirectional communication to name a few examples. The UE 110 may be a mobile phone, tablet computer, computer and the like. The UE 110 may a part of a vehicle or provide a vehicle communication capabilities. Hence, the UE 110 may provide a vehicle-related (V2X) communication services. The cellular communication network may thus comprise one or more V2X UEs (V2X UE may mean or refer to a vehicular UE). The cellular communication network may additionally comprise regular UEs, such as mobile phones used by users to perform voice calls and the like.

Now with reference to FIG. 1A, a communication link 164 may be established between the network element 102 and the UE 110, wherein the communication link may be used to provide services, such as V2X services, to the UE 110. The UE 110 may move away from cell 104 to another cell 114 (i.e. trajectory 150; UE's 110 initial position is indicated with a dash line object). The cell 114 may, for example, be controlled by different network element 112 or by the same network element 102. In the example, the cellular communication network (or simply referred to as a network) may perform a handover of the UE 110 from cell 104 to cell 114. This may require communication 162 between the network elements 102, 112. Said communication may refer to one or both direct communication between the network elements 102, 112, and communication via some other entity of the network. The handover may enable the UE 110 to be server by the cell 114 and be in communication with the network element 112 via link 166. Thus, the service to the UE 110 may be maintained even though the UE 110 has left the cell 104.

Vehicle communication is an enabler for various connected car use cases, such as broadcasting situation awareness messages for assisted driving, sending emergency alerts (e.g., braking, vulnerable road user detection) to increase safety, executing cooperative manoeuvres such as lane merging or platooning and more. Vehicular connectivity over 3GPP cellular technology is termed as C-V2X and is being standardized starting with LTE-A and its evolution into 5G. One particular V2X communication pattern is called vehicle to infrastructure, when the vehicles are connected to base stations (e.g., LTE eNBs, 5G gNBs) and exchange data with backend servers or other vehicles through the cellular communication network (e.g. RAT) (as opposed to device-to-device communication, where the data is exchanged directly between the UEs without going through the network). Vehicle to infrastructure communication is thus prone to handover related degradations as they move along their trajectories and the serving base station or cell changes. However, as shown in FIG. 1A, handovers may be used to provide continued service along the trajectory 150. In general, handovers in cellular networks may initiated, by the network element 102, based on radio measurements collected from the UEs (V2X or C-V2X context a vehicle may be referred to as an UE). E.g. the UE 110 may periodically report the received or measured power or quality of the current serving cell and nearby neighbour cells to the network, which may use the received information to decide when and to which target cell a handover is initiated (e.g. in FIG. 1A from cell 104 to cell 114). Normally, handover triggers are based on a set of radio parameters (radio quality thresholds, offsets and hysteresis) defined at each network element between its own cells and all potential neighbouring cells. The handover parameters may be defined on the cell pair level; therefore, the same parameters may apply to all UEs that are connected to a given cell.

Connected vehicles using C-V2X technology may require stable and reliable connectivity to the cellular network to comply with the stringent quality and safety standards for assisted and automated driving use cases. Cellular connectivity may be disrupted even by successful handovers as the UE's radio connection (e.g. communication link 164) to the current serving (source) cell 104 is terminated and then re-established to the target cell 114 (e.g. link 166). During handover, the UE may have no connectivity with the network, i.e., it cannot send or receive any data (no communication with backend servers, no message exchange with nearby vehicles through the infrastructure). Vehicles may be more exposed to such events due to their higher speed than, e.g., pedestrian users; also, the impact of a handover interruption on a vehicular application may be higher than, e.g., on a web page download.

For example, in certain complex terrains and geographical situations, radio signal quality may change very abruptly as a function of the UE location and speed in a way unforeseen during radio planning. Therefore, a UE moving fast along a trajectory (e.g., road lane) may experience different handover anomalies. Referring once again to FIG. 1A, one such anomaly may a ping-pong handover anomaly. That is, if the trajectory 150 of the UE 110 would come back within cell 104, the UE 110 may be handed over back to network element 102. For example, the handover from cell 104 to cell 114 may have been unnecessary in such case if the cell 104 could have been used all the time to provide the needed service.

Another handover anomaly may be experienced in the example of FIG. 1B and referred to as short stay handover anomaly. For example, the UE 110 along its trajectory 150 moves through cell 124 provided by a network element 122. Hence, the UE 110 may first be handed over to cell 124 and then to cell 114, although one handover from cell 104 to cell 114 would have been sufficient. For example, due to high speed of the UE 110, the stay within cell 124 is so short that it may not be beneficial to be used at all by the UE 110.

However, for stationary UEs and/or slow moving UEs, cell 124 may provide needed service and provide benefits for the network (e.g. cell offloading and the like).

A further anomaly may be seen in FIG. 1C showing cell 134 provided by network element 132. In this case, the anomaly may be remote cell handover anomaly caused by, for example, unconventional radio environment. That is, cell 134 may not necessarily be configured to extend to area of the trajectory 150, but due to some environmental cause, the UE 110 may measure said cell 134, and possibly the network may determine that a handover from cell 104 to cell 134 is needed. For example, such unconventional radio environment may be caused by a water surface or structures (e.g. signals bouncing). Handover to remote cells may be problematic because the handover procedure execution (including C-plane negotiation between the source and target network elements 102, 132) may take longer than usual.

It is pointed out that such handovers may be successful from control plane procedural point of view but they may represent anomalies as they may cause degradation on the vehicular application level communication and functionality (e.g., increased delays and delay variation in vehicular control loops, inability to exchange messages required for safe cooperative manoeuvre completion, etc.) due to repeated connectivity disruption. The apparent success of the handovers themselves may make these anomalies invisible to traditional handover success based Key Performance Indicators (KPIs) and Operations Support System (OSS) tools, and thus they may trigger no optimization action or alarm. Therefore, even carefully planned and well operated networks today may contain significant amount of such hidden anomalies (e.g., concentrated at coverage areas with challenging radio propagation environment), that may cause issues to vehicular applications.

In addition to invisible anomalies, handovers may also fail due to unsuccessful procedural execution, e.g., interrupted by Radio Link Failure (RLF) due to too early or too late handover, or handover to wrong cell. Such failures may be visible through alarms or failure counters and may even be input to Self-Organizing Network (SON) functions (Automatic Neighbour Relation (ANR), Mobility Robustness Optimization (MRO)) with the objective to optimize the cell level handover parameters and reduce handover related connectivity failures. Still, as the handover parameters may be defined on the cell level, changing the parameters may consequently apply to all UEs attached to the same cell. On the other hand, the optimal handover point (or, ultimately, the decision whether certain handovers should be enabled at all) may be specific to individual UEs and their real-time mobility context or condition, i.e., motion trajectory, velocity, current and predicted future locations, antenna capabilities, etc. Even the same individual UE moving along the same mobility trajectory may benefit from different handover conditions depending on its actual context. Applying the same parameters to all UEs (even if the parameters are optimized by a SON or other function) means that there could still be individual UEs or certain mobility situations for which the common cell level configuration is not favourable. Such UEs may experience RLFs, handover failures or handover anomalies (e.g. ping-pong, short stay), disrupting the vehicular communication and possibly jeopardizing functionality and safety. Therefore, it may be beneficial to provide solutions which reduce such interruptions.

Figure 2:
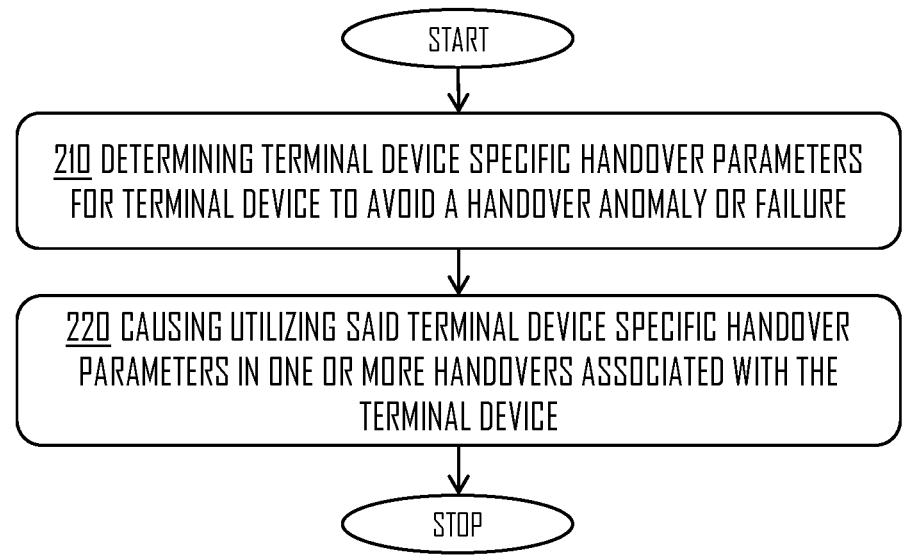
FIGS. 2 and 12 illustrate flow diagrams according to some embodiments.

FIG. 2 illustrate a flow diagram according to an embodiment. Referring to FIG. 2, a method in a cellular communication network (e.g. vehicular network or comprising a vehicular network) comprises, upon detecting that a terminal device has or is going to have a mobility condition previously determined to be associated with a handover anomaly or failure, determining (block 210) terminal device specific handover parameters for said terminal device to avoid said handover anomaly or failure; and causing utilizing (block 220) said terminal device specific handover parameters in one or more handovers associated with the terminal device.

Block 220 may refer to different things explained later in more detail. However, causing utilizing the terminal device specific handover parameters (also referred to as UE specific handover parameters) may comprise, for example, transmitting said parameters to the terminal device for the terminal device to use said parameters. For example, the terminal specific handover parameters may comprise and/or indicate terminal device and/or cell pair specific handover threshold, handover hysteresis, handover time to trigger, and/or handover enablement/disablement. Hence, the terminal device and/or the network may use said parameters to perform one or more handovers related to the terminal device. Thus, for example, both the network and the terminal device may be aware which cell(s) are excluded as a possible target cell.

Said terminal device described with reference to FIG. 2 may be or comprise the UE 110, for example. The handover anomalies may refer to different situations described with respect to FIGS. 1A to 1C. Handover failure may refer to failure of the handover as generally understood by the skilled person. The cellular communication network may refer to cellular communication network(s) described with respect to FIGS. 1A to 1C and the like. Hence, for example, the cellular communication network may comprise vehicular network(s). Utilizing said terminal device specific handover (HO) parameters may mean that said parameters are used in a handover (HO) or HO event regarding said terminal device. For example, said HO may refer to HO from cell 104 to cell 114. For example, utilizing said parameters detected HO anomalies may be avoided (e.g. network has previously detected that HO from cell 104 to cell 124 is not beneficial when the predicted trajectory is according to trajectory 150; instead direct HO from cell 104 to cell 114 may be caused by said parameters).

So, in general, the cellular communication network (or simply network) may detect handover anomalies and/or failures, and use these detections in determining in determining the UE specific handover parameters. Determining and/or detecting one or more mobility conditions associated with handover anomalies or failures may be performed, by the network, in a separate step before detecting that a certain UE has such mobility condition. Said separate step, however, may be performed continuously and/or periodically to determine mobility condition(s) which are related to handover anomalies or failures. Therefore, the network may, based on determining a mobility condition of a UE, determine whether said mobility condition is associated with handover anomaly or failure based on previously detected mobility conditions of UE(s) (i.e. one or more UEs) which are already determined to be associated with handover anomaly or failure.

As one example with reference to FIGS. 1A to 1C, the network may determine that trajectory 150 is related to and/or causes handover anomaly. Hence, once it detects such trajectory associated with a UE, the network may act accordingly. For example, the network may decide to exclude cell 124 or 134 as possible target cells. Hence, handover anomalies of FIGS. 1B and 1C may not happen. It is noted that there may be many different ways to detect that the UE 110 has a certain mobility condition that is associated with a certain anomaly or failure. It is also pointed out that different UEs may have different mobility conditions and thus it may be beneficial to determine UE specific handover parameters. For example, a V2X UE may move with a higher speed than a mobile phone used by a pedestrian. These conditions may be indiated by the mobility condition. Hence, the network may utilize different handover parameters for one or more V2X UEs compared with other UEs (e.g. mobile phones) in the network.

As used in this application, mobility condition may refer to a certain context regarding mobility of the UE. Hence, for example, the mobility condition may comprise and/or be determined based on UE's trajectory, speed, and/or location (s) (e.g. current and/or future). On the other hand, the mobility condition may indicate or comprise sequence of serving cells. For example, referring to FIG. 1B, such sequence could be or comprise cell 104, cell 124, and cell 114 when a UE 110 is on trajectory 150. Hence, detecting/predicting such cell sequence pattern can be used to trigger determining UE specific parameters that avoid detected anomaly (e.g. short stay in cell 124). For example, the network may receive information on the UE 110 and determine, based on said information, UE's 110 mobility condition. Mobility condition may be indicated in many different ways, but the purpose may be to associate certain mobility conditions with handover anomalies or failures, and use such association to avoid certain handovers. I.e. if a mobility condition of the UE 110 matches a mobility condition associated with an anomaly or failure, the network may take certain action(s) to avoid said detected anomaly or failure. Action(s) may include excluding possible target cells and/or scheduling one or more handovers (e.g. delaying a handover or causing a handover to be performed earlier than normally). These actions may be controlled using the UE specific handover parameters. The use of UE specific handover parameters enables the network to customize handovers on the UE level. For example, such may cause reducing the number/intensity of handovers while maintaining full cellular service continuity. One possible use case of the provided solution may be to improve cellular V2X communications by eliminating or at least reducing handover anomalies such as ping-pongs, short stays and handover failures for individual vehicular UEs. The UE specific handover parameters may comprise and/or indicate UE and cell pair specific handover threshold, handover hysteresis, handover time to trigger, and/or handover enablement/disablement.

Figure 3:
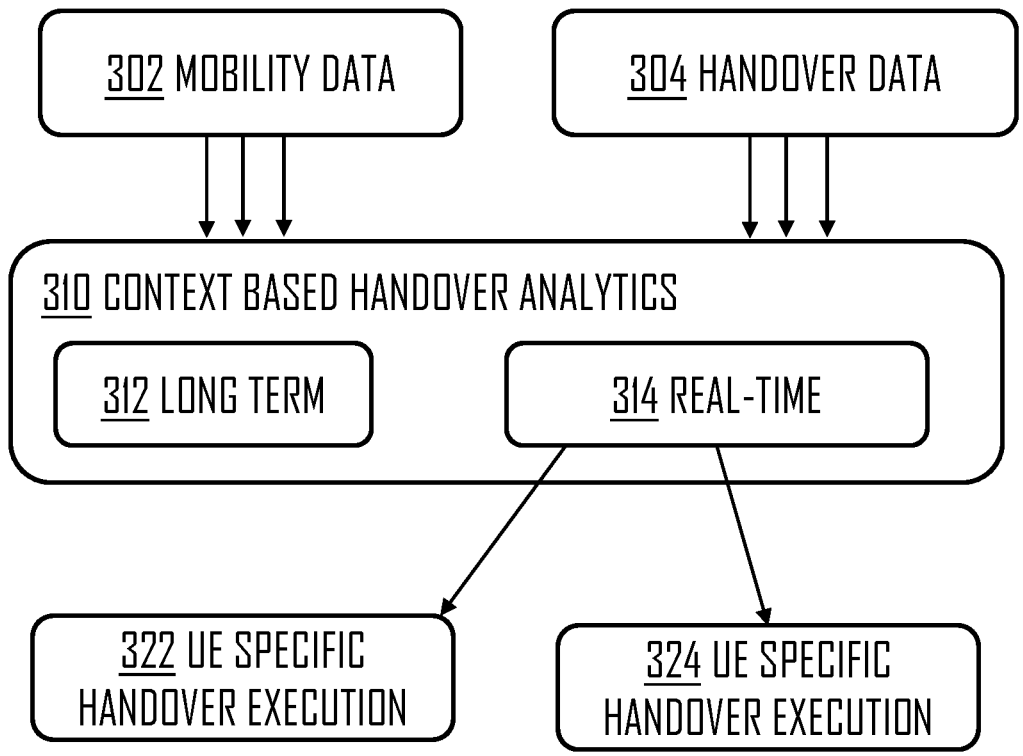
FIGS. 3, 4, and 5 illustrate some embodiments.

FIG. 3 illustrates an embodiment. Referring to FIG. 3, the solution may utilize two different analytics engines 310: long term analytics 312 and real-time analytics 314. These analytics engines may be realized by the cellular communication network, e.g. by a network element or network elements of the network. For example, said analytics engines may be Virtual Networking Functions (VNFs), but can also be provided by physical entities. In an embodiment, each engine is realized by specific circuitry. In an embodiment, the engines are realized by a processing circuitry cooperating with memory and included software code.

The long term analytics 312 may be configured to collect and correlate handover data 304 (including but not limited to: cell IDs, UE identity, time, and/or handover success/failure, etc.) and/or mobility data 302 (including but not limited to: location, speed, trajectory including future path/locations, UE capabilities such as model, and/or radio/antenna parameters, etc.) from a plurality of UEs (e.g. all UEs or all detected UEs) within a coverage area of the cellular communication network over a certain time period. For example, the network may store mobility data 302 and handover data 304 regarding one or more handovers performed in the network. Said stored information may be referred to as history data, for example. The long term analytics 312 may analyse the collected data to detect and learn the mobility conditions that usually cause handover anomalies or failures, i.e. associate certain mobility conditions with handover anomaly or failure.

The handover data 304 may comprise data on performed handovers in the network. That is, when a handover regarding a UE is performed, the network may store information about said handover, and the context based handover analytics 310 may use said information when detecting possible mobility conditions associated with handover anomalies and/or failures. The mobility data 302 may comprise data which may indicate the mobility condition of the UE before, during and/or after the handover, i.e. mobility condition associated or regarding the handover. Hence, the network may correlate the mobility data 302 with the handover data 304, and use said data to detect mobility conditions which are associated with handover anomalies and/or failures. Additionally or alternatively, the network may determine mobility conditions which are associated with successful handovers and/or successful handovers without anomalies. This information may be used to determine possible UE specific handover parameters which avoid anomalies and/or failures.

According to an embodiment, the long term analytics 312 is further configured to calculate handover sequences that would eliminate or reduce the detected anomalies or failures (e.g., by excluding certain cells from the handover sequences, or changing the conditions when handover is triggered between certain cells). The desired handover sequences may need to comply with the condition of service continuity (e.g., a cell may only be excluded from a handover sequence if the remaining ones still provide continuous coverage). For example, with reference to FIG. 1B, cell 124 may be excluded as trajectory 150 is all the time within cell 104, cell 114 or within both cells 104, 114. Hence, the network may determine that cell 124 is not needed, the cell 124 may be excluded, and thus the anomaly may be avoided. In general, according to an embodiment, the network is configured to determine the HO parameters for each UE such that they fulfil the service continuity requirement. Hence, for example, cell or cells are not excluded as targets cells if the excluding may cause discontinuity in service (e.g. within certain area).

The real-time analytics and/or optimization 314 may be configured to monitor mobility and/or cellular connectivity of individual UEs (e.g. UE 110) to detect and/or predict if a UE is or is going to be in a mobility condition that causes handover anomalies or failures. For example, this may be determined by comparing current trajectory with known trajectories associated with handover anomalies or failures. As known, trajectory may refer a path that a moving object (i.e. UE in this case) follows through space or coverage area as a function of time. Hence, both speed and location may be of relevance.

In an embodiment, the real-time analytics and/or optimization 314 may further be configured to calculate the desired or needed handover sequence of the UE that does not contain the problematic handovers. Such calculation may comprise determining which cell(s) should be excluded from the handover sequence and/or determining when handovers should be executed, for example. The UE specific handover parameters may then be calculated or determined based on the desired or needed handover sequence to avoid the detected handover anomalies and/or failures.

In an embodiment, the network (i.e. the real-time analytics and/or optimization function or engine 314) changes the UE specific handover parameters in real-time. This may enable the UE to avoid the problematic handovers (i.e. which are determined to cause anomalies or failures). The calculation may considers both the usual (i.e. long-term) handover sequences and the current cell states to ensure that the desired handover sequence still provides access to all cells that are required for continuous connectivity for the UE. Hence, the optimization, for example, by excluding target cells is performed such that the connectivity for the UE is tried to always be ensured. I.e. cell may not be excluded if it substantially increases possibility of connectivity and/or service failure even though, for example, some handover anomaly is detected. Hence, when determining the UE specific handover parameters, the network may try to ensure that the connection between the UE and the network is maintained (e.g. no RFLs are accepted).

Accordingly, UE specific handover execution 322, 324 may be obtained using the UE specific handover parameters. Hence, for example, a handover of a first UE may be performed according to block 322 and a handover of a second UE may be performed according to block 324, wherein both UEs are subject to different UE specific handover parameters. So, for example, the first UE associated with a certain speed or velocity is handed over from cell 104 to cell 124 of FIG. 1B, whereas second UE associated with higher speed or velocity is handed over from cell 104 to cell 114 to avoid the short stay anomaly. So, in this example, a speed or velocity over certain threshold may trigger the network to determine UE specific handover parameters which cause the network to perform the handover as described above. It may also be possible that the network utilizes some UE specific handover parameters for a certain number or UEs, but also manages cell specific handover parameters for rest of the UEs as will be disclosed later in more detail. Hence, the cell specific handover parameters may be applied to the first UE in some examples. Another example may be a route trigger. For example, the network may determine that vehicular UEs (i.e. V2X UEs) are moving on a certain route. Hence, for said vehicular UEs the network may utilize certain handover parameters which may, for example, cause excluding of one or more target cells. In an embodiment, the network utilizes both the route and speed triggers (e.g. trajectory trigger(s)).

In an embodiment, the mobility condition comprise speed or velocity. For example, if a speed or velocity of an UE exceeds a threshold, the UE specific HO parameters may be determined by the network for said UE. That is, the network may associate speed at or over certain threshold to be associated with handover anomaly or failure. In such case, exceeding the speed or velocity threshold may cause the network to exclude one or more target cell candidates. According to an embodiment, small cells, such as pico, femto and/or micro cells, are excluded. In an embodiment, the speed or velocity threshold is used in addition with a location requirement or criterion. That is, speed or velocity within certain area or areas exceeding the threshold may trigger the network to determine UE specific HO parameters.

According to an embodiment, the network determines, based on collected data about one or more handovers, one or more mobility conditions associated with one or more handover anomalies or failures. In an embodiment, said collected data about one or more handovers comprises the mobility data 302 and/or the handover data 304. In an embodiment, said collected data comprises handover data 304 correlated with the mobility data 302 of a plurality of terminal devices. So, handover data 304 of plurality of UEs and corresponding mobility data 302 of plurality of UEs may be used in determining the handover anomalies and failures, and associating said handover anomalies and failures with certain mobility condition or conditions.

According to an embodiment, the network determines, based on said collected data (i.e. mobility data 302 and/or handover data 304) about one or more handovers, one or more handover sequences that reduce a risk of handover anomalies or failures; utilizes said determined one or more handover sequences when determining the terminal device specific handover parameters (e.g. UE specific handover execution in block 322, 324). Reducing the risk of handover anomalies or failures may refer to generally reducing said risk, or at least reducing a risk of detected anomaly or failure. That is, if certain mobility condition is determined to be associated with certain anomaly or failure with respect to certain handover or handovers, said handover or handovers may be avoided with UEs having said mobility condition. For example, a different kind of handover (i.e. different target cell) may be used instead.

According to an embodiment, the network takes into account said collected data about the one or more handovers when determining the terminal device specific handover parameters. So, as said, certain handover(s) may be avoided regarding UE or UEs with certain mobility condition.

According to an embodiment, the network takes into account mobility data and/or cellular connectivity data regarding an UE when determining the terminal device specific handover parameters. So, for example, two or more UEs may have same mobility condition, but may have different cellular connectivity (e.g. different antenna causing different connectivity). Hence, the determination about possible handover anomaly or failure may be different. Purely as an example with respect to FIG. 1B, a first UE may detect (i.e. measure) cell 124 whereas a second UE may not detect the cell 124. For example, the UEs may have different antenna sensitivity. Hence, although both UEs would have the same mobility condition (e.g. trajectory 150), the UE specific handover parameters may be different. That is, for the first UE, cell 124 may be excluded from possible target cells, whereas for the second UE there may be no such need as the cell 124 cannot be the target cell due to non-detection. For example, the non-detection may additionally or alternatively be caused by the second UE not supporting the RAT of the cell 124 (e.g. 4G UE, but cell 124 is 5G). In general, the network may further use UE specific data, such as UE capability information (e.g. model, radio parameters and/or antenna parameters) when determining the UE specific handover parameters.

According to an embodiment, the network determines the UE specific handover parameters in real-time. For example, the parameters may be determined, generated and/or changed in response to determining that the mobility condition of the UE is associated with a certain handover anomaly and/or failure.

According to an embodiment, the terminal device specific handover parameters indicate exclusion of one or more cells as one or more target cell candidates. E.g. cell 124 may be excluded as a target cell when UE 110 is handed over from cell 104, and follows trajectory 150.

According to an embodiment, the terminal device specific handover parameters have an effect on when one or more handovers are performed. That is, the handover parameters may comprise handover trigger (e.g. A3 A2, A3, A4), offset, hysteresis and/or time-to-trigger parameters. That is, said parameter(s) may be used to adjust and/or define when the one or more handovers are initiated and/or performed. E.g. the parameters may indicate when the one or more handovers are performed.

According to an embodiment, the terminal device specific handover parameters are determined if the following condition is additionally fulfilled: a current or predicted cellular communication network status (e.g. vehicular network status) is substantially similar compared with a cellular communication network status at the time of the handover anomaly or failure. So, basically block 210 of FIG. 2 is initiated once the current or predicted network status is substantially similar compared with the network status at the time of the handover anomaly or failure and detecting that the terminal device has or is going to have a mobility condition previously determined to be associated with the handover anomaly or failure. So, in this embodiment, both conditions may need to be fulfilled before performing actions of block 210 and consequently block 220. Network state may refer to status of the network and may include parameters such as network load, indication of operative cells, available capacity, and the like. Purely as an example, there may be no need to exclude cell 124 of FIG. 1B if said cell is not operational at the moment when the UE 110 is on the trajectory 150. Other way around, it may be beneficial to exclude said cell 124 if it is operational. So, in general, the network may take into account operational status of at least a sub-part of the network when determining the UE specific HO parameters.

Figure 4:
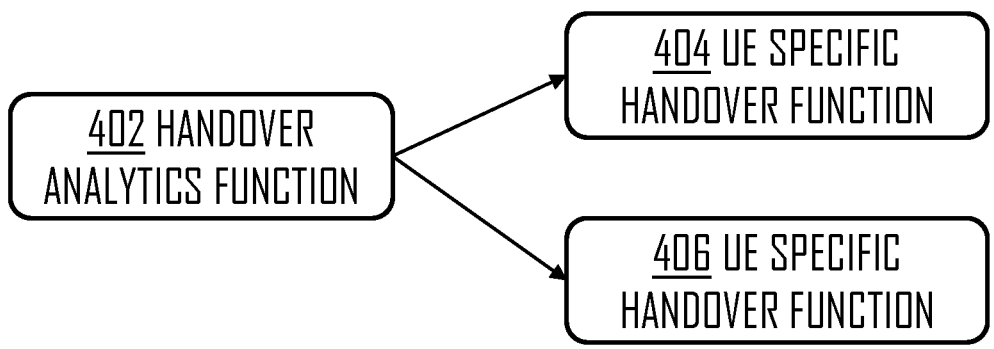

Let us then discuss some embodiments in more detail. FIG. 4 illustrates an embodiment showing different functions of the described solution. That is, UE specific handover functions 404, 406 that may enable UE level handover differentiation in the Radio Access Network (RAN) and a handover analytics function 402 that monitors and analyses the UEs and handovers, computes UE specific handover parameters and dynamically configures the UE specific handover functions. The handover analytics function 402 may interact with multiple UE specific handover functions 404, 406, as shown in FIG. 4, e.g. command different functions 404, 406. The UE specific handover functions 404, 406 may control the handovers of the respective UEs according to the commands (e.g. HO parameters) from the handover analytics function 402.

According to an embodiment, the UE specific handover function 404, 406 is implemented at the radio access nodes (e.g., LTE eNBs or 5G gNB) extending the current cell pair specific handover implementation. Currently, for example, in LTE, eNB side handover implementation relies on neighbour relation tables present in each eNB. The Neighbour Relation Table (NRT) at a given eNB may specify the list of potential handover target cells for each of the eNB's own cells. A target cell may be a cell at the same eNB or a cell at a different eNB; the source and target cells may operate at the same frequency or at different frequencies. For each source-target cell pair, the conditions for handovers may also be defined at the eNB, including the handover trigger (e.g., A2, A3, A4 measurement), the corresponding measurement offset, hysteresis and time to trigger. The handover trigger may define the unit that the UEs are measuring and reporting to the eNB (e.g. Reference Signal Received Power (RSRP)/ Reference Signal Received Quality (RSRQ) of the current serving cell and that of a limited number of neighbour cells). The measurement offset and hysteresis together with the trigger may define how much the measured unit of the current serving cell and that of a neighbour cell needs to differ from each other or from pre-configured absolute threshold values so that a handover condition is considered by the eNB from the current source cell to the neighbour cell (e.g., the neighbour cell's RSRQ should be higher than the current cell's RSRQ by no less than 3 dB). The time to trigger defines how long the handover condition needs to be continuously fulfilled before the handover from the source cell to the neighbour cell is initiated by the eNB. It is noted that eNB and LTE are used as examples of implementation. However, it needs to be understood that similar or same solution may be applicable to other systems utilizing handover procedure.

Figure 5:
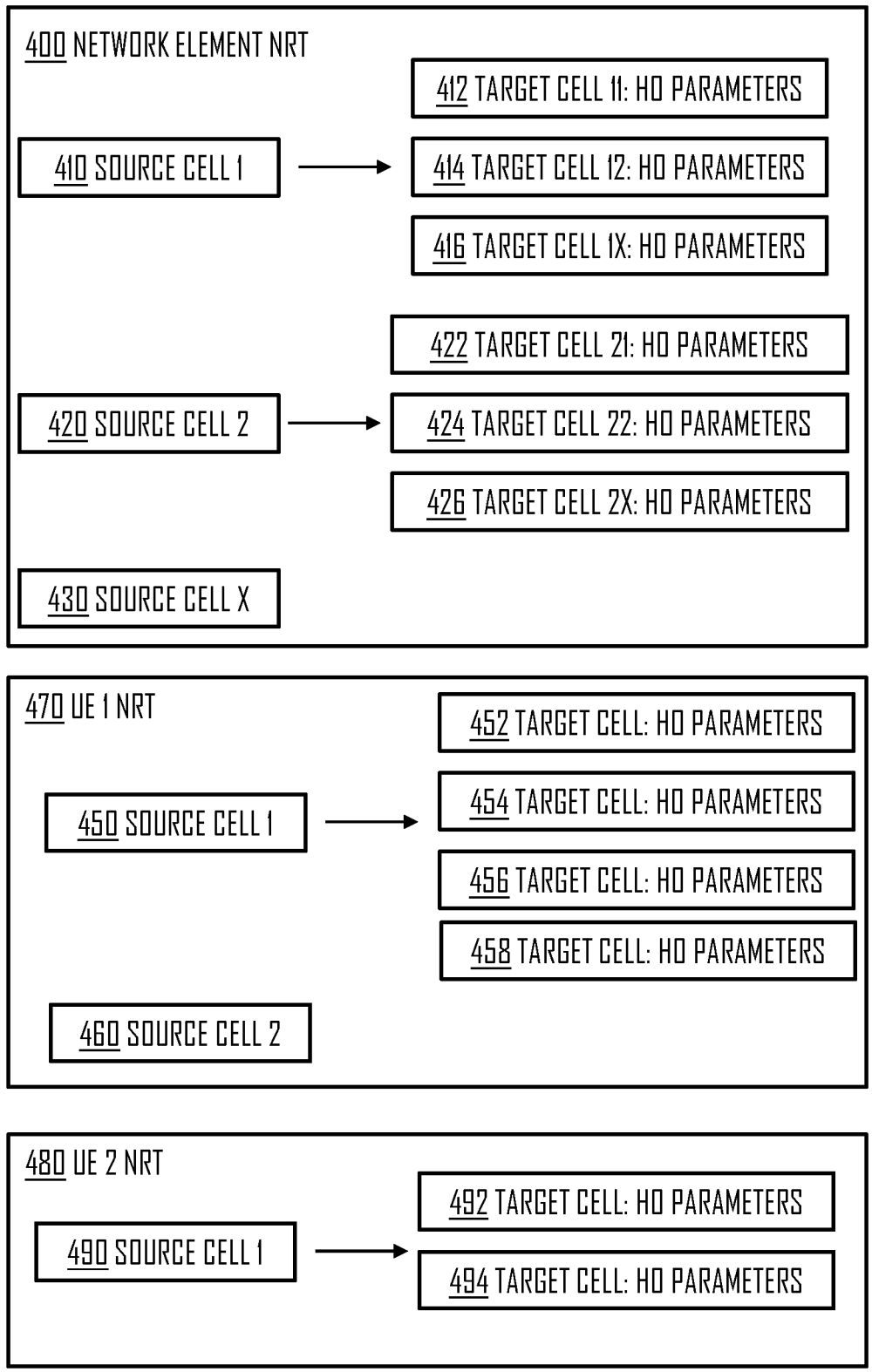

Currently, the eNB may apply the same handover trigger, measurement offset, hysteresis and time to trigger regardless of the identity of the UE that is reporting the measurements, therefore all UEs may go through the same decision process and handovers under the same circumstances. To further enhance the presented solution per-UE handover operation, additional UE specific neighbour relation tables (UE-NRT) may be implemented. Example of this may be shown in FIG. 5 showing UE specific NRT 470 for UE 1 and UE specific NRT 480 for UE 2. Each UE specific NRT (or sometimes referred to simply as UE-NRT) may be associated with a given UE identity and it may indicate or list potential source-target cell pairs valid for that UE along with the UE specific handover measurement and conditions corresponding to each source-target cell pair. The list of cell pairs in the UE-NRT may be the same, subset of, superset of, partially overlapping with or disjoint from the cell pairs in the network element level NRT 400 (e.g. eNB level NRT). For each source-target cell pair that exists in both the eNB level NRT and an UE-NRT, the handover parameters in the eNB level NRT and the UE-NRT may be the configured with the same or different values.

With reference to FIG. 5, the network may use UE specific NRTs 470, 480 while retaining the existing network element level NRT 400. For example, the network element level NRT 400 may indicate first source cell 410 and its one or more target cell pairs 412, 414, 416. Similarly, a second source cell 420 and its target cells 422, 424, 426 may be indicated. Hence, one or more source cells 410, 420, 430 and their corresponding pair candidates may be indicated (candidates for cell 430 are not shown in FIG. 5, but may still be used).

Similar logic may apply to the UE specific NRTs 470, 480, but instead of being for all UEs, the NRTs 470, 480 may be specific for certain UE or a group of UEs. For example, the network may group UEs based on UE capability information, and associated the group with certain UE specific NRT 470, 480. For example, NRT 470 for UE 1 indicate one or more source cells 450, 460 and their corresponding target cell candidates 452, 454, 456, 458 (i.e. candidates when cell 450 is the source cell). Similarly, NRT 480 for UE 2 may indicate source cell 490 and its target candidates 492, 494. So, the number of target candidates may be the same, more or less compared with the network element level NRT 400. The handover parameters 412, 414, 416, 422, 424, 426, 452, 454, 456, 458, 492, 493 may indicate applicable handover parameters for certain source cell/target cell pair. In the presented solution, this can be made per UE whereas the known solutions may only enable such configuration on cell/network element level. It is noted that UE-NRTs 470, 480 may indicate target candidates for the same cells as are indicated in NRT 400. That is, a first source cell 410 may mean same cell as first source cell 450 and first source cell 490. However, these are illustrated in FIG. 5 with different reference numbers for clarity reasons. So, basically NRTs 400, 470, 480 may actually indicate, at least in some examples, same source cells and their candidates (which may be different per NRT) and additional HO parameters regarding each source-target cell pair candidate.

Figure 6A:
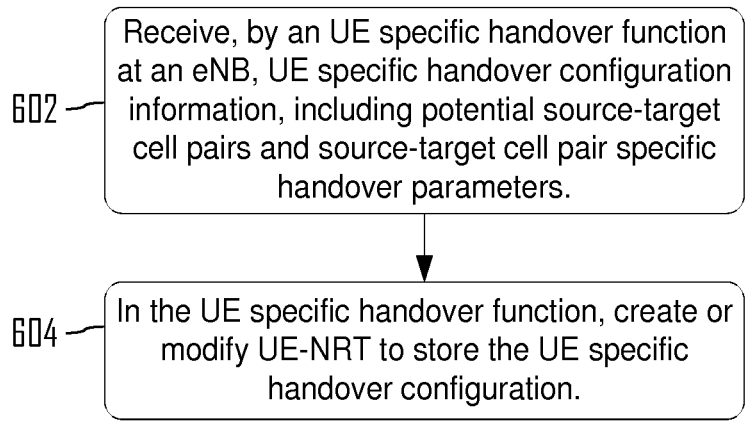
FIGS. 6A and 6B illustrate flow diagrams according to some embodiments.

So, according to an embodiment, the network causes creating or modifying a terminal device specific table (e.g. UE-NRT 470, 480) based on the terminal device specific handover parameters. For example, the network element 102 may update and/or create the NRT(s) 470, 480 according to the determined handover parameters. The modification of an existing UE-NRT may include changing the list of source-target cell pairs and/or the handover parameters of one or more source-target cell pairs. One example of this may be seen in FIG. 6A illustrating a process according to an embodiment. Referring to FIG. 6A, the network obtains (block 602) UE specific handover configuration information. Said information may include potential source-target cell pairs (e.g. source: cell 104, targets: 114, 124) and source-target cell pair specific handover parameters (e.g. threshold for handovers and the like). In block 604, the network may create (if such UE NRT does not exists) or modify (if already exists) UE specific NRT based on the information obtained in block 602. For example, the functions of blocks 602 and 604 may be performed in a UE specific handover function 404, 406.

Figure 6B:
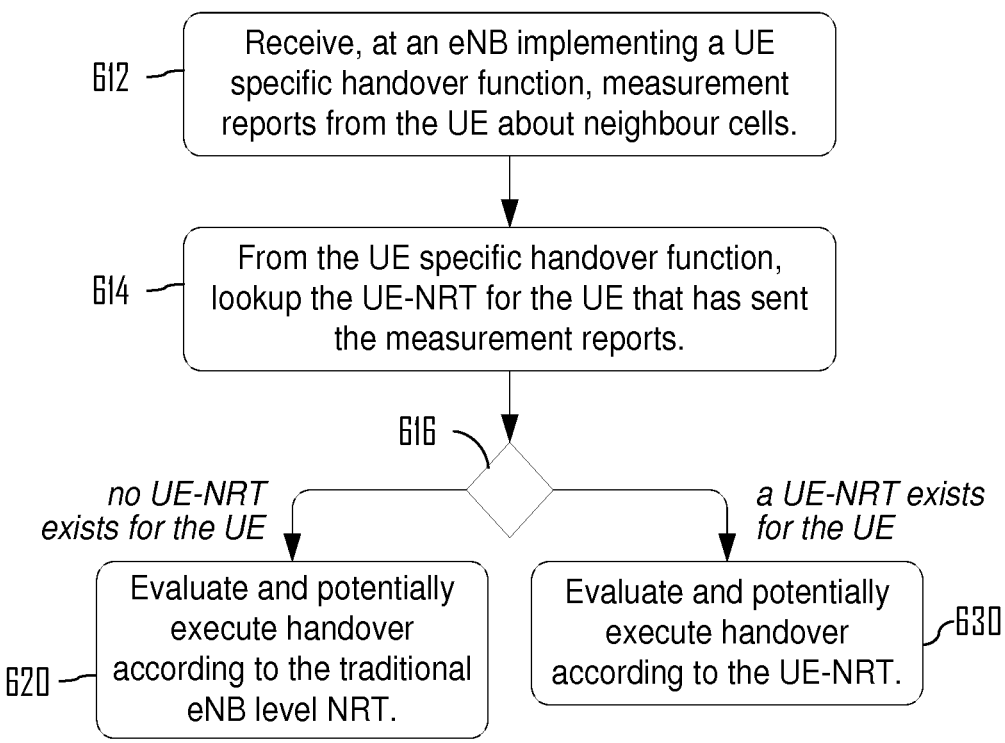

FIG. 6B illustrates a flow diagram according to an embodiment. Referring to FIG. 6B, in block 612, the network (e.g. network element 102) may receive measurement reports from one or more UEs (e.g. UE 110) about neighbour cells of the UE. In block 614, the network may look for UE specific NRT for an UE that has sent report(s) in block 614. In block 616, the network may determine whether the UE specific NRT for said UE exists: if yes, the process may continue to block 630. If not, the process may continue to block 620. In block 620, the network may determine to perform handovers according to the network element level NRT (e.g. NRT 400). In block 630, the network may determine to perform handovers according to the UE specific NRT (e.g. NRT 470, 480) corresponding to the specific UE. So, for example, when an eNB evaluates the measurement reports received from a given UE, it checks whether the UE has a corresponding UE-NRT: if yes, the UE-NRT may take precedence over the eNB level NRT and the eNB level NRT is disregarded; otherwise the eNB level NRT may be regarded as valid. The UE-NRT mechanism may therefore be capable of selective handover specialization targeting individual UEs (i.e., those for which UE-NRT tables exist), whereas for the rest of the UEs the operation defaults to the eNB level NRT, or generally network element level NRT if some other technique than LTE or LTE-A is used.

According to an embodiment, the network element may cause receiving (block 612) of a one or more measurement reports from a terminal device; cause determining (blocks 614, 616) whether the terminal device is associated with a terminal device specific table (i.e. UE specific NRT); and upon determining that the terminal device is associated with the terminal device specific table, causing utilizing (block 630) said terminal device specific table in one or more handovers triggered based on said one or more measurement reports, otherwise causing utilizing (block 620) a cell specific table in one or more handovers triggered based on said one or more measurement reports.

The UE-NRT 470, 480 may specify, by listing the source-target cell pairs, which handovers are enabled for the corresponding UE and for each potential handover it may define the conditions for initiating the handover. Accordingly, the UE may not be eligible to handover from a source cell to a target cell if the source-target cell pair is not listed in the UE-NRT. According to some embodiments, the network may have at least two alternatives to enforce that only eligible handovers are executed for a UE according to its UE-NRT.

First option is that that the implementation is transparent to the UE. That is, the network enables the UE or UEs to measure and report all detected cells including the cells which are not listed as potential target cells (i.e. are excluded or not listed as target cell candidates). The network may not need to take any action regarding configuring the measurements. However, the network may ignore measurement reports regarding target cells which are not listed in the UE specific NRT, and take said measurement reports forward for handover condition evaluation that indicate a valid target cell. Therefore, the networks handover decision process may select eligible handover targets for the UE. The benefit of this alternative is that no further signalling between the network and the UE may be needed to enforce the restrictions in the UE-NRT.

Second option is that the implementation involves signalling between the network and the UE. Accordingly, in an embodiment, the network causes indicating one or more cells to the UE or UEs in order to enable the UE to perform measurements regarding one or more target cell candidates of the terminal device specific table. For example, the network may configure the UE to only collect and report measurements on neighbour cells that are potential handover targets listed in the UE-NRT. For example, the configuring may comprise transmitting one or more control messages to the UE. The control messages may be UE specific, i.e. targeted to a certain UE or in some cases to a plurality of UEs. wherein the same measurement configuration is applicable to plurality of UEs. The network may then consider all measurement reports for handover evaluation without filtering with respect to the UE-NRT (i.e. UE specific NRT). The advantage of this alternative may be that the UE does not spend resources for measuring neighbour cells that would be later discarded by the network.

Different methods for identifying the UEs may be used. One may be the use of subscriber identity. Alternatively or additionally, a valid implementation may use UE terminal type (e.g., International Mobile Equipment Identity (IMEI), or coarse terminal category such as vehicle/non-vehicle, etc.) as UE identity to differentiate handovers per UE type/category. Identification by any other UE or subscriber attribute as well as any attribute collectible from the current UE's behaviour or generated traffic (e.g., active applications) may also be used. For scalability, an implementation may share the same UE-NRT between multiple UEs in case the same specialized handover conditions would apply to them, e.g., using memory pointers from different UE identities to the same memory location where the shared UE-NRT instance is stored. In case a shared UE-NRT needs to be changed only for a subset of the UEs sharing the UE-NRT, the Copy on Write (COW) memory object instantiation method may be used. So, for example, the UE specific NRT could be utilized for all detected V2X UEs, whereas some other table (e.g. NRT 400) could be utilized for all other UEs. It is also pointed out that the UE specific NRTs may be configured on network element level, i.e. said UE specific NRTs may also differ from network element to network element.

Let us then reflect on the handover analytics function 402 which may be a logically centralized entity that is responsible for managing UE specific handover within a geographical or administrative area. The Handover analytics function 402 may be implemented as a software entity running on existing network elements or in clouds or data centres (e.g., as a VNF similarly as the UE specific handover functions 404, 406 may be VNFs). The handover analytics function 402 may monitor and collect real time UE context information and real time handover information from its responsibility area. The UE context information (e.g. mobility data 302) may include but is not limited to: UE identity, timestamp of information, position, speed, trajectory, and/or future locations, etc. For vehicular UEs, the context information is available from the Cooperative Awareness Message (CAM) or Decentralized Environmental Notification Message (DENM) messages generated by each vehicle periodically or under certain road/traffic events. Future locations may be collected from navigation application containing the planned trajectory of the vehicle. The handover information (e.g. also refer to as handover data 304) includes but is not limited to: UE identity, source/target cells, timestamp, handover success/failure, cause code, time spent disconnected from the network. The handover information may be available from control plane network elements such as the MME or from attached data collection functions/products such as Nokia Traffica.

Figure 7:
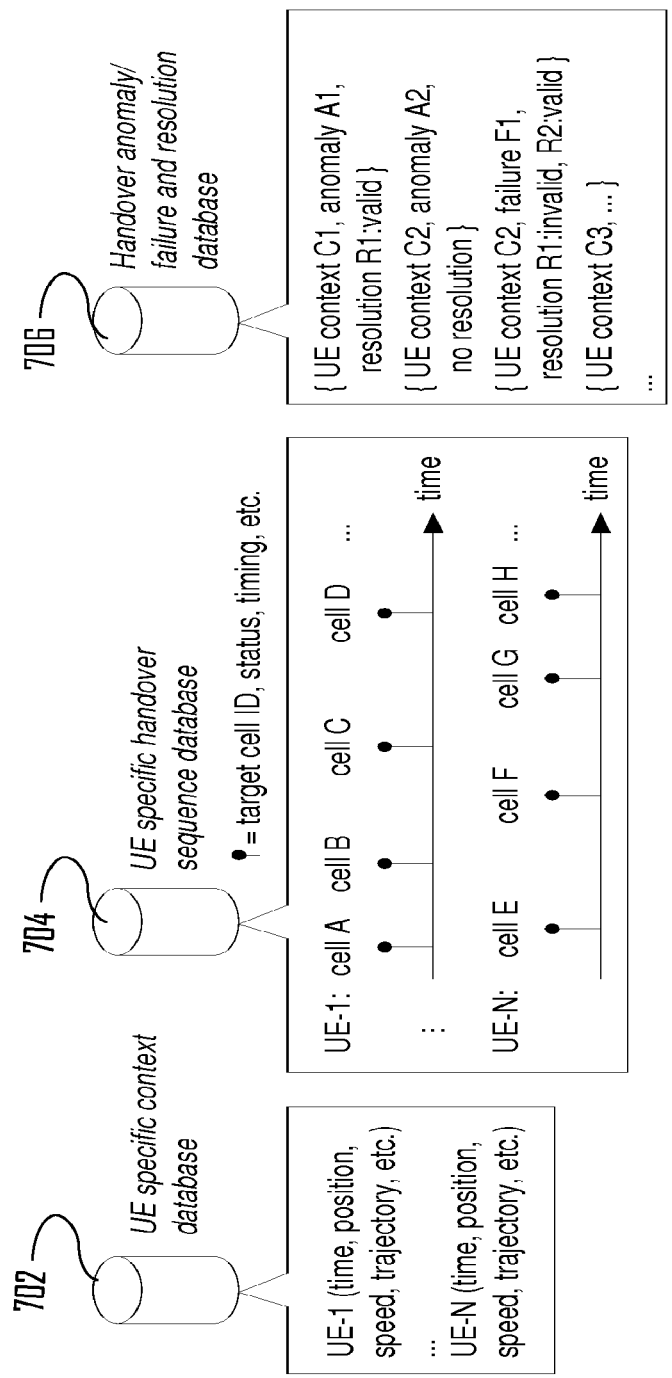
FIGS. 7, 8, 9, and 10 illustrate some embodiments.

FIG. 7 illustrates three different databases 702, 704, 706 maintained by the handover analytics function 402 according to an embodiment. Referring to FIG. 7, the handover analytics function 402 may maintain three databases:

UE specific context database 702: for each UE, it may contain UEs latest context. Each new context information collected from the UE (e.g., at each periodic CAM message) may be updated to the database, which may act as a cache of the UE status.

UE specific handover sequence database 704: for each UE, it may record the sequence of cells the UE has traversed through via handovers. Each handover event may update the handover sequence of the corresponding UE with the new serving cell (i.e., handover target) cell identity along with additional information such as the success/failure or handover, cause code (e.g., too early, too late, RLF) in case of failure, amount of time the UE spent disconnected from the network, etc. The database 704 may act as an accumulator that reconstructs and follows the handover sequence of each UE separately.

Handover anomaly/failure and resolution database 706: may accumulate the result of the long-term analytics 312, recording those UE contexts when handover anomaly/failure is detected. The UE identity may or may not be part of the UE context information recorded in this database. For each recorded anomaly/failure, the network may identify (e.g. calculate and verify) and store the valid resolution(s) that describe how to prevent the given handover anomaly and/or failure in the given UE context. It is possible that not all anomalies have a valid resolution (e.g., all touched cells within a handover sequence may be still required for coverage even though there are short stays in between). In that case, the absence of a valid resolution may be noted as 'no resolution'. Also, formerly valid or pre-calculated resolutions may turn out to be invalid, which is detected by monitoring the outcome of each applied resolution; therefore, they may be marked as invalid so that the network may determine not to execute the invalid resolutions in the future.

Figure 8:
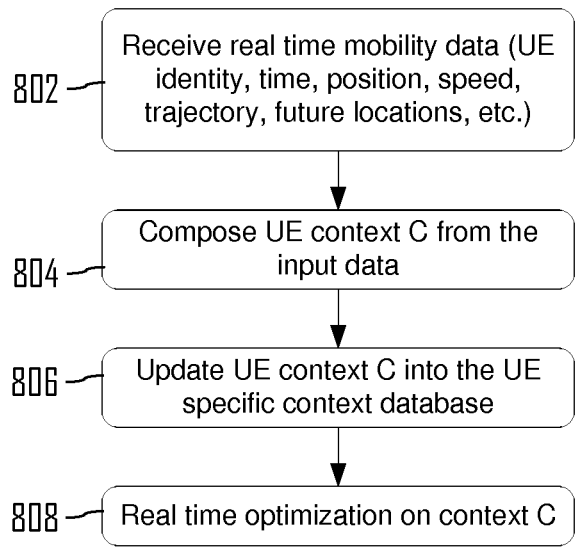
Figure 9:
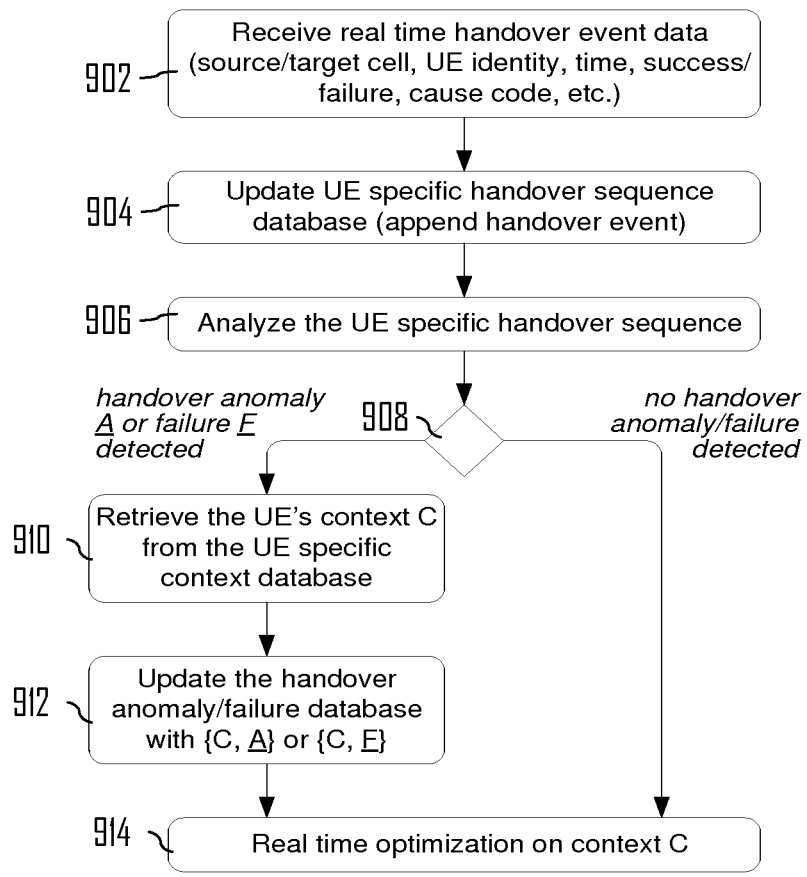
Figure 10:
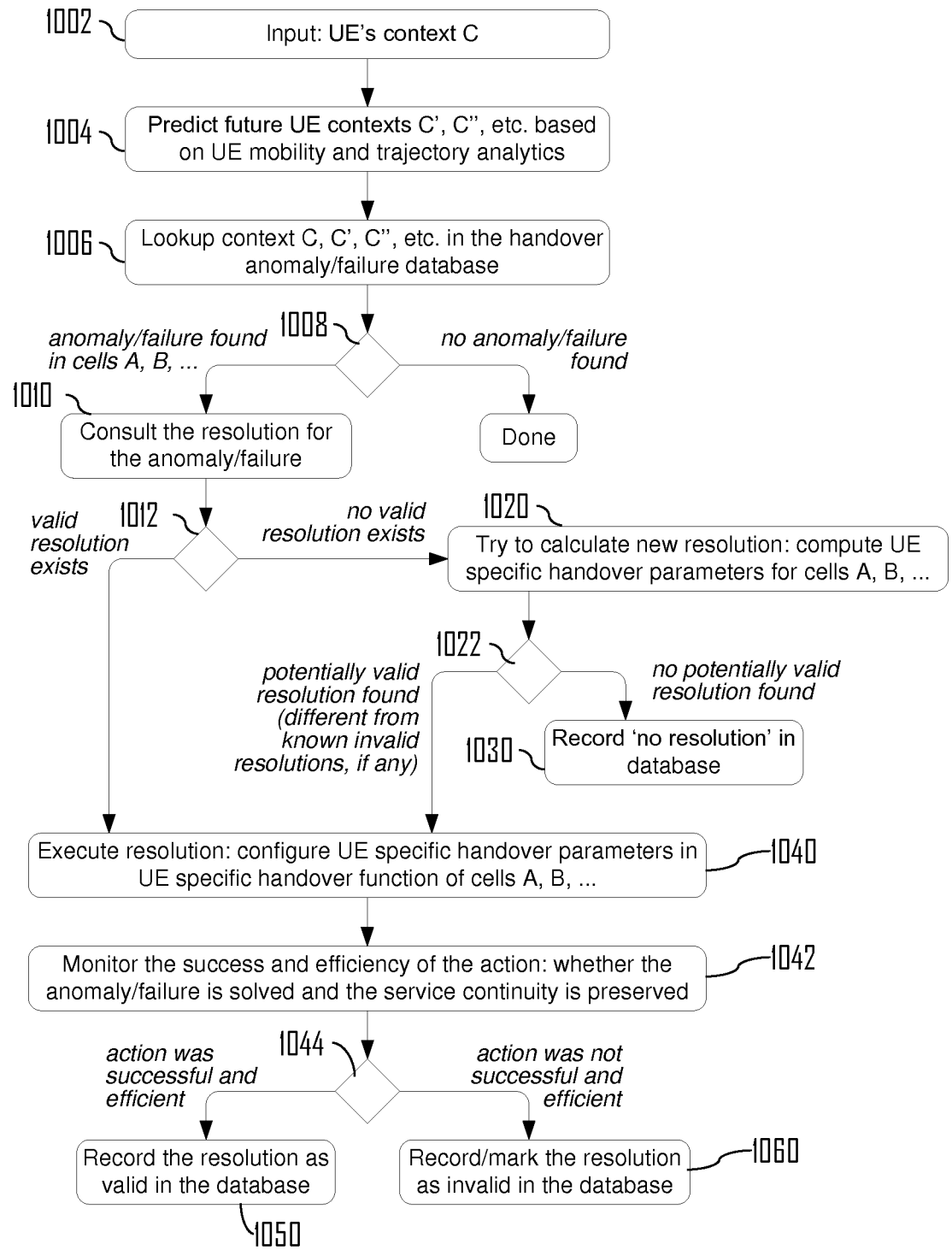

The network, e.g. the handover analytics function 402, may utilize said one or more databases 702, 704, 706 when determining the UE specific HO parameters. FIGS. 8, 9 and 10 illustrate some embodiments regarding maintaining and/or utilizing database(s) 702, 704, 706. Referring first to FIG. 8, in block 802 the handover analytics function 402 may receive real time mobility data (e.g. mobility data 302) regarding an UE or UEs, such as UE ID, time, position, speed, trajectory, and/or, future locations and the like. In block 804, the handover analytics function 402 may determine or compose UE context (e.g. context C) based on the mobility data. In block 808, the handover analytics function 402 may update the database 702 based on the determined UE context. In block 808 real time optimization on context C may be triggered.

Referring to FIG. 9, in block 902, the handover analytics function 402 may receive real time handover event data (e.g. handover data 304). In block 904, the handover analytics function 402 may update UE specific handover sequence database (database 704) based on the handover event data. Further, in block 906, the handover analytics function 402 may analyse one or more UE specific handover sequences and determine in block 908 whether there is handover anomaly or failure associated with the specific sequence or sequences. If there is, the process may continue to block 910, and if not the process may continue directly to block 914. In block 910, the handover analytics function 402 may retrieve context of the UE in question from database 702 (e.g. based on UE ID), and update handover anomaly/failure database 706 by storing a data entry indicating certain UE context (e.g. mobility condition) associated with a handover anomaly or failure. E.g. context C is associated with anomaly A and/or failure F. Handover anomalies such as ping-pongs or short stays may be detected based on the repeating cell sequence and/or the amount of time elapsed between consecutive handovers. Handover to remote cell may be detected based on the amount of time the UE spent disconnected from the network during handover (i.e., between detaching from the source cell until attaching to the target cell). Handover failures and corresponding cause codes may be available from control plane protocol results directly. In case any handover anomaly or failure is detected, the UE's context along with the type of handover problem is recorded in the long-term handover anomaly/failure database 706, as described. In block 914, real time optimization may be triggered (e.g. UE specific HO parameter determination) may be triggered by the network for the UE in question.

Referring to FIG. 10, the process comprised in or after block 808, 914 may be shown. The real time optimization procedure may be triggered for a UE both after updating its context (FIG. 8) or its handover sequence (FIG. 9) as any change in the UE's state (such as mobility/speed change, new serving cell) may trigger a need for targeted handover configuration (e.g. determining handover parameters for said UE). The objective of the procedure of FIG. 10 may be to (1) evaluate if the UE is approaching a location or is in a state that is usually impacted by handover anomaly/failure (according to the long-term handover anomaly/failure database 706); (2) calculate and store possible resolutions (UE specific handover parameters and reconfigurations) for handover anomalies/failures; (3) execute the resolutions if needed to avoid such anomalies/failures; (4) maintain the validity of the resolutions by monitoring if the reconfiguration successfully solved the handover problem and that it did not introduce service discontinuity or coverage problems.

In block 1002 UE's context may be inputted. In block 1004, UE's future context may be predicted. For example, UE's trajectory may be predicted. In block 1006, the network may determine whether the current or predicted context is found from database 706: i.e. is there any recorded anomalies or failures associated with said context(s). Block 1008: if there is, the process may continue to block 1010 in which the network may determine whether a resolution for said anomaly or failure exists (e.g. excluding some cell as target cell). Otherwise, the process may end (i.e. 'Done'). I.e. the process may end if no anomaly or failure is detected regarding one or more contexts (e.g. C, C', C"). For example, C' and C" may refer to predicted UE contexts. In block 1012: if no valid resolution exists (i.e. is not found based on block 1010), the process may continue to block 1020. If a valid resolution or resolutions is found, the process may continue to block 1040.

In block 1020, the network may at least try to calculate or determine a valid resolution for said context or contexts. I.e. the network may try to determine a new valid resolution for said context(s) to avoid one or more detected handover anomalies and/or failures. In block 1022, if a new valid resolution is computed successfully and/or found, the process may continue to block 1040. However, if no valid resolution is found, the process may continue to block 1030 in which the network may store 'no resolution' to the database 706 with respect to said context(s). New resolution may mean a potential resolution, as said resolution may not have been tested as it has just now been calculated. In block 1040, the network may execute the found resolution (e.g. stored in to the database or calculated in block 1020) by configuring the UE specific handover parameters in UE specific handover function(s) 404, 406.

In block 1042, the network may monitor the performed resolution. In block 1044, based on block 1042, the network may determine whether said resolution was successful or not. This may comprise performing one or more measurements and/or monitoring one or more handovers performed on the basis of the indicated UE specific handover parameters. If yes, the action may be recorded as valid resolution in database 706 (block 1050). If not, the action may be recorded as invalid solution in database 706 (block 1060). So, for example, the calculated resolution in block 1020 may be stored as a valid resolution if the handover anomaly and/or failure is determined to be avoided using the calculated resolution.

In an embodiment, the network monitors the one or more handovers performed on the basis of said terminal device specific handover parameters; and based on the monitoring, if said handover anomaly or failure is avoided by utilizing said terminal device specific handover parameters, stores an indication about said UE specific handover parameters avoiding said handover anomaly or failure with respect to said mobility condition (e.g. user context C, C', and/or C").

In an embodiment, upon detecting that a second UE has or is going to have said mobility condition associated with said handover anomaly or failure, the network determines UE specific handover parameters for said second terminal device to avoid said handover anomaly or failure on the basis of the stored indication. So, by storing a determined valid resolution into a database, the network may use the same resolution for other UEs having same or similar mobility condition.

As described above, the UE specific configuration action described in FIG. 10 may adjust handover trigger, offsets, hysteresis, and/or time to trigger (e.g., to prevent ping-pong anomalies) or remove certain handover relations completely (e.g., to prevent short stay or remote site anomalies). For example, if the UE is likely to experience ping-pong handover (e.g., as previously UEs moving along the same trajectory with the same speed experienced it), the handover hysteresis can be increased between the source-target cells prone to ping-pong so that once a handover is executed there the UE is not handed back any more. In another example, the handover to a certain cell may be prohibited selectively for UEs currently moving with high speed (e.g. speed or velocity exceeding certain threshold) to avoid short stay or handover to remote cell problem. Note, however, that such handovers to remote cells (or short stays) may be eliminated in case the cells reachable via the remaining handover possibilities are currently providing contiguous and good coverage for the UE. To some extent the validity of a new handover configuration may be evaluated in advance during its calculation phase (e.g., by monitoring the RSRP/RSRQ measurement reports sent by the UE for all potential neighbour cells and considering the quality of the cells that would remain accessible after the handover reconfiguration). If the UE reports good RSRP/RSRQ for all cells that would remain reachable after blocking a certain short stay or remote cell handover, it may be safe to block the anomalous handover; otherwise, the handover possibility may be kept as continuous service may be more important than optimizing out anomalous handovers at the risk of creating a coverage hole. After calculating a new resolution for a handover problem or executing an already known resolution (block 1040), its success and efficiency may be monitored (block 1042). Success may mean whether the action removed the handover anomaly/failure and efficiency may mean that the action did not introduce additional problems such as discontinuous coverage. Resolutions along with their validity (based on the success and efficiency) may be recorded in the handover anomaly/failure database 706 to avoid the need for re-calculation in the same context and to avoid probing for a solution that has failed previously. In case the network deployment changes (e.g., cell radio parameters such as transmission power or positioning such as tilting or azimuth change, or new cells are added to the network), the profiling of the handover anomalies/failures as well as the corresponding resolutions is updated by taking into account the new environment. This may include re-evaluating previously invalid resolutions or forgetting anomalies/failures that do not exist anymore.

Figure 11:
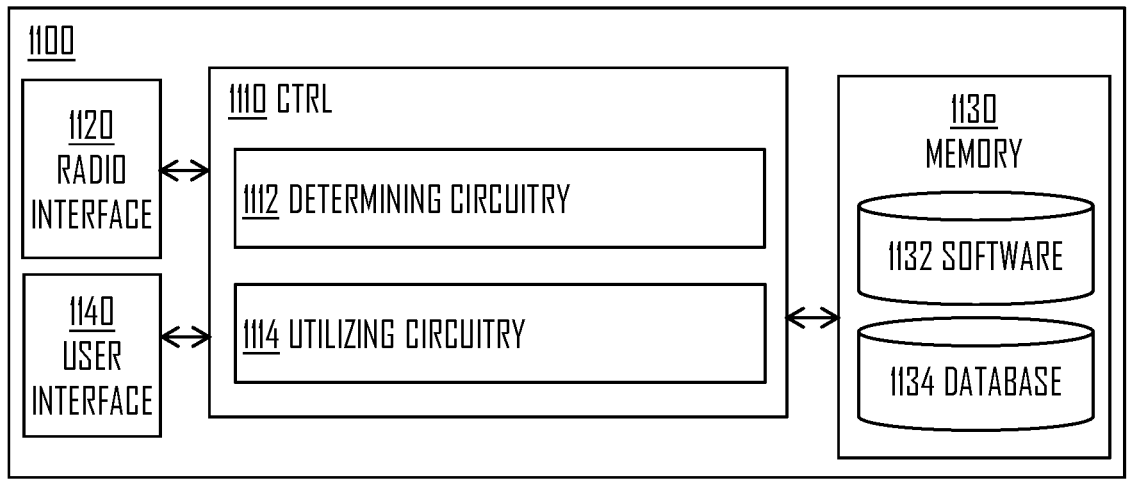
FIGS. 11 and 13 illustrate apparatuses according to some embodiments.

FIG. 11 provides apparatus 1100 comprising a control circuitry (CTRL) 1110, such as at least one processor, and at least one memory 1130 including a computer program code (software) 1132, wherein the at least one memory and the computer program code (software) 1132, are configured, with the at least one processor, to cause the respective apparatus 1100 to carry out any one of the embodiments of FIGS. 1A to 10, or operations thereof.

Referring to FIG. 11, the memory 1130 may be implemented using any suitable data storage technology, such as semiconductor based memory devices, flash memory, magnetic memory devices and systems, optical memory devices and systems, fixed memory and removable memory. The memory 1130 may comprise a database 1134 for storing data. For example, the database 1134 may comprise one or more of databases 702, 704, 706. In more general terms, the database 1134 may be used to store information on mobility conditions associated with handover anomalies and/or failures. The database 1134 may additionally comprise information about valid and/or invalid resolutions to said anomalies and/or failures.

The apparatus 1100 may further comprise radio interface (TRX) 1120 comprising hardware and/or software for realizing communication connectivity according to one or more communication protocols. The TRX may provide the apparatus with communication capabilities to access the radio access network, for example. The TRX may comprise standard well-known components such as an amplifier, filter, frequency-converter, (de)modulator, and encoder/decoder circuitries and one or more antennas. For example, the TRX may enable communication between the UE 110 and the network element 102. Further, the TRX may provide access to the X2-interface and/or Xx-interface by the network element 102, for example. The TRX may thus be used to realize wired and/or wireless communication according to one or more communication protocols.

The apparatus 1100 may comprise user interface 1140 comprising, for example, at least one keypad, a microphone, a touch display, a display, a speaker, etc. The user interface 1140 may be used to control the respective apparatus by a user. For example, the network element 102 may be configured using the user interface comprised in said network element. The user interface 1140 may be configured to enable remote access and/or remote controlling of said device.

In an embodiment, the apparatus 1100 may be or be comprised in a base station (also called a network element, an access node, a base transceiver station, a Node B, a radio network controller, an eNB, or a gNB, for example). The apparatus 1100 may be the network element 102, for example. Further, the apparatus 1100 may be configured to perform the steps of FIG. 2 and embodiments thereof. In an embodiment, the apparatus 1100 is comprised in the network element 102. In an embodiment, the apparatus 1100 is comprised in or realizes functionality of fixed network architecture. Fixed network architecture may refer to parts of the network that are used to provide cellular services to terminal devices.

Referring to FIG. 11, according to an embodiment, the control circuitry 1110 comprises a determining circuitry 1112 configured to determine terminal device specific handover parameters for a terminal device to avoid a handover anomaly or failure upon detecting that said terminal device has or is going to have a mobility condition previously determined to be associated with said handover anomaly or failure; and a utilizing circuitry 1114 configured to cause utilizing said terminal device specific handover parameters in one or more handovers associated with the terminal device. Embodiments of such operation are described above in more detail.

In an embodiment, at least some of the functionalities of the apparatus 1100 may be shared between two physically separate devices, forming one operational entity. Therefore, the apparatus 1100 may be seen to depict the operational entity comprising one or more physically separate devices for executing at least some of the described processes. Thus, the apparatus 1100 utilizing such shared architecture, may comprise a remote control unit (RCU), such as a host computer or a server computer, operatively coupled (e.g. via a wireless or wired network) to a remote radio head (RRH) located in the base station or network element. In an embodiment, at least some of the described processes may be performed by the RCU. In an embodiment, the execution of at least some of the described processes may be shared among the RRH and the RCU.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

Hence, as at least some of the steps of the presented solution are described as performed by the network or some specific entity of the network, it is pointed out that at least the apparatus 1100 may be configured to perform such method steps according to the description. This may mean, for example, that the apparatus 1100 realizes the functions 310, 312, 314. For example, the apparatus 1100 may realize the functions 402, 404, 406. As said, the apparatus 1100 may be realized as centralized unit or as utilizing shared resources, and thus realized as a plurality of interacting and/or interconnected entities performing the functions of the apparatus 1100.

Figure 12:
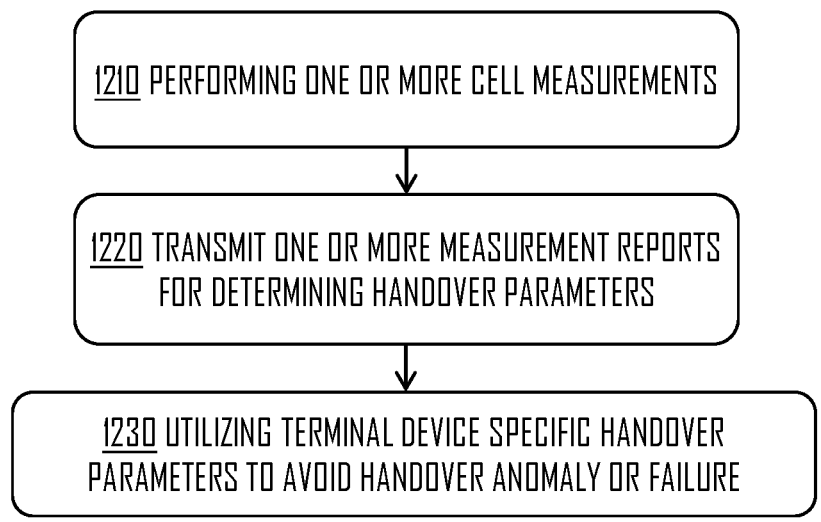

FIG. 12 illustrates a flow diagram from the UE (e.g. UE 110) perspective according to an embodiment. Referring to FIG. 12, a method in a UE comprises: performing one or more cell measurements (block 1210); transmitting, based on said one or more cell measurements, one or more measurement reports to the cellular communication network for determining handover parameters (block 1220); and utilizing terminal device specific handover parameters in one or more handovers associated with the terminal device to avoid a handover anomaly or failure, wherein the terminal device specific handover parameters are determined based on detecting that the terminal device has or is going to have a mobility condition previously determined to be associated with the handover anomaly or failure (block 1230).

As described above, according to an embodiment, the UE performs measurements on one or more cells indicated by the cellular communication network (e.g. one or more control messages from the network to the UE), said one or more cells indicated as target cell candidates in a terminal device specific neighbour relation table. So, for example, the network may instruct the UE to only perform measurements on potential target cell candidates and not on cells which are not on the UE-NRT table. As described earlier, the configuration may be UE specific by using UE specific control message(s), for example. In other words, the cellular network may instruct the UE to perform measurements on one or more cells and/or instruct the UE to exclude one or more cells as cells which should be measured by the UE. Said cell measurements may comprise, for example, measuring cell power (i.e. signal quality) of a cell or cells. The UE may indicate said measurement(s) to the network.

Figure 13:
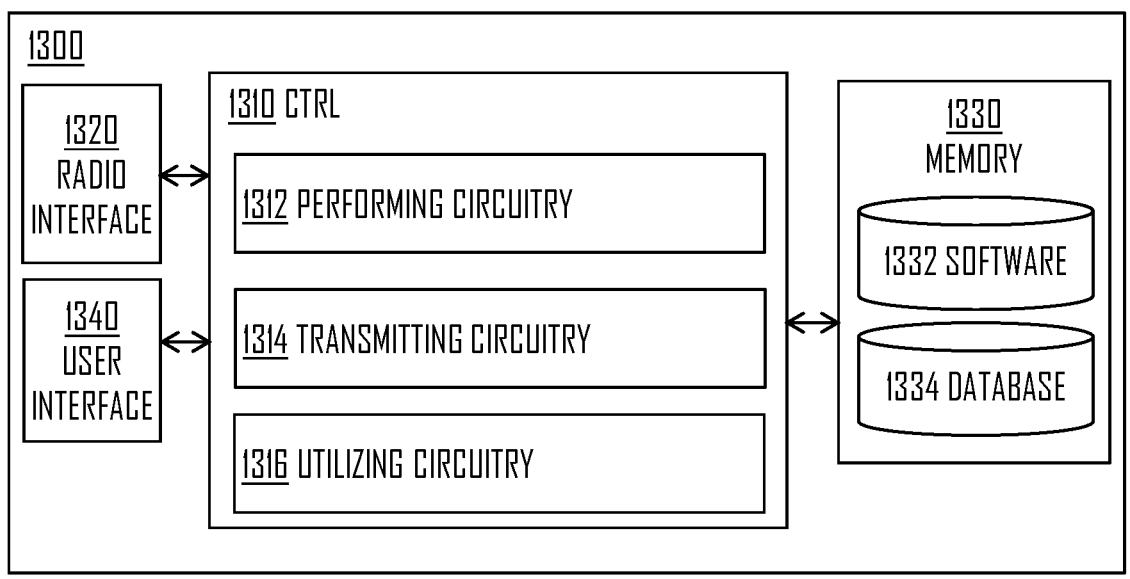

FIG. 13 provides an apparatus 1300 comprising a control circuitry (CTRL) 1310, such as at least one processor, and at least one memory 1330 including a computer program code (software) 1332, wherein the at least one memory and the computer program code (software) 1332, are configured, with the at least one processor, to cause the respective apparatus 1300 to carry out any one of the embodiments of FIGS. 1A to 10 and 12, or operations thereof of the UE.

Referring to FIG. 13, the memory 1330 may be similar as the memory 1130, for example. The apparatus 1300 may further comprise radio interface (TRX) 1320 comprising hardware and/or software for realizing communication connectivity according to one or more communication protocols. The apparatus 1300 may comprise user interface 1340 comprising, for example, at least one keypad, a microphone, a touch display, a speaker, etc.

In an embodiment, the apparatus 1300 may be or be comprised in a UE (e.g. UE 110). The apparatus 1300 may be the UE performing steps of FIG. 12.

Referring to FIG. 13, according to an embodiment, the control circuitry 1310 comprises a performing circuitry 1312 configured to perform operations of block 1210; a transmitting circuitry 1314 configured to perform operations of block 1220; and a utilizing circuitry 1316 configured to perform operations of block 1230.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1A to 10 and 12 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1A to 10 and 12 or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 1A to 10 and 12, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1A to 10 and 12 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method comprising:
    collecting handover data correlated with mobility data of a plurality of terminal devices in a cellular communication network;
    determining, based on the collected data, one or more trajectories associated with one or more handover anomalies or failures;
    monitoring mobility or cellular connectivity of terminal devices;

detecting that a terminal device has or is going to have a trajectory that is determined to be associated with a handover anomaly or failure, determining terminal device specific handover parameters for said terminal device to avoid said handover anomaly or failure;

utilizing said terminal device specific handover parameters in one or more handovers associated with the terminal device;

monitoring the one or more handovers performed on the basis of said terminal device specific handover parameters;

based on monitoring the one or more handovers performed, and said handover anomaly or failure being avoided by utilizing said terminal device specific handover parameters, storing an indication about said terminal device specific handover parameters avoiding said handover anomaly or failure with respect to said trajectory;

creating or modifying a terminal device specific neighbor relation table based on the terminal device specific handover parameters;

receiving of one or more measurement reports from the terminal device;

determining whether the terminal device is associated with a terminal device specific neighbor relation table; and upon determining that the terminal device is associated with the terminal device specific neighbor relation table, utilizing said terminal device specific neighbor relation table in one or more handovers triggered based on said one or more measurement reports, otherwise utilizing a cell specific neighbor relation table in one or more handovers triggered based on said one or more measurement reports.

2. The method of claim 1, further comprising:
determining, based on said collected data about one or more handovers, one or more handover sequences that reduce a risk of handover anomalies or failures; and
utilizing said determined one or more handover sequences when determining the terminal device specific handover parameters.

3. The method of claim 1, further comprising:
taking into account said collected data about the one or more handovers when determining the terminal device specific handover parameters.

4. The method of claim 1, further comprising:
taking into account mobility data or cellular connectivity data regarding said terminal device when determining the terminal device specific handover parameters.

5. The method of claim 1, wherein the terminal device specific handover parameters indicate exclusion of one or more cells as one or more target cell candidates.

6. The method of claim 1, wherein the terminal device specific handover parameters have an effect on a performed handover of the one or more handovers.

7. The method of claim 1, wherein the terminal device specific handover parameters are determined in response to the following additional condition fulfilled: a current or predicted cellular communication network status is substantially similar compared with a cellular communication network status at the time of the handover anomaly or failure.

8. The method of claim 1, further comprising:
indicating one or more cells to the terminal device in order to enable the terminal device to perform measurements regarding one or more target cell candidates of the terminal device specific neighbor relation table.

9. The method of claim 1, wherein the trajectory is associated with handover anomaly, wherein the handover anomaly is a ping pong handover anomaly or a short stay handover anomaly.

10. The method of claim 1, further comprising:
upon detecting that a second terminal device has or is going to have said trajectory associated with said handover anomaly or failure, determining terminal device specific handover parameters for said second terminal device to avoid said handover anomaly or failure at least partly on the basis of the stored indication.

11. A method comprising:
performing, by a terminal device in a cellular communication network, one or more cell measurements;
transmitting, based on said one or more cell measurements, one or more measurement reports to the cellular communication network for determining handover parameters;
utilizing terminal device specific handover parameters in one or more handovers associated with the terminal device to avoid a handover anomaly or failure, wherein the terminal device specific handover parameters are determined based on detecting that the terminal device has or is going to have a trajectory that is determined to be associated with the handover anomaly or failure and based on that said terminal device specific handover parameters avoid said handover anomaly or failure with respect to said trajectory; and
performing said one or more cell measurements on one or more cells indicated by the cellular communication network, said one or more cells indicated as target cell candidates in a terminal device specific neighbor relation table, wherein
the terminal device specific neighbor relation table is based on the terminal device specific handover parameters, and
the terminal device specific neighbor relation table is configured for a determination of whether to utilize the terminal device specific neighbor relation table or a cell specific neighbor relation table in one or more handovers triggered based on said one or more measurement reports, the determination being based upon whether the terminal device is associated with the terminal device specific neighbor relation table.

12. An apparatus comprising:
at least one processor; and
at least one memory storing instructions that, when executed by the at least one processor, cause the apparatus at least to perform operations comprising:
upon detecting that a terminal device has or is going to have a trajectory that is determined to be associated with a handover anomaly or failure, determine terminal device specific handover parameters for said terminal device to avoid said handover anomaly or failure;
collect handover data correlated with mobility data of a plurality of terminal devices;
determine, based on the collected data, one or more trajectories associated with one or more handover anomalies or failures;
monitor mobility or cellular connectivity of terminal devices;
utilize said terminal device specific handover parameters in one or more handovers associated with the terminal device;

monitor the one or more handovers performed on the basis of said terminal device specific handover parameters;

based on the monitoring the one or more handovers performed, and said handover anomaly or failure being avoided by utilizing said terminal device specific handover parameters, store an indication about said terminal device specific handover parameters avoiding said handover anomaly or failure with respect to said trajectory;

create or modify a terminal device specific neighbor relation table based on the terminal device specific handover parameters;

receive of one or more measurement reports from the terminal device;

determine whether the terminal device is associated with a terminal device specific neighbor relation table; and upon determining that the terminal device is associated with the terminal device specific neighbor relation table, utilize said terminal device specific neighbor relation table in one or more handovers triggered based on said one or more measurement reports, otherwise utilize a cell specific neighbor relation table in one or more handovers triggered based on said one or more measurement reports.

13. An apparatus comprising:

at least one processor; and at least one memory storing instructions that, when executed by the at least one processor, cause a terminal device at least to perform operations comprising:

performing one or more cell measurements;

transmitting, based on said one or more cell measurements, one or more measurement reports to a cellular communication network for determining handover parameters;

utilizing terminal device specific handover parameters in one or more handovers associated with the terminal device to avoid a handover anomaly or failure, wherein the terminal device specific handover parameters are determined based on detecting that the terminal device has or is going to have a trajectory that is determined to be associated with the handover anomaly or failure and based on that said terminal device specific handover parameters avoid said handover anomaly or failure with respect to said trajectory; and performing said one or more cell measurements on one or more cells indicated by the cellular communication network, said one or more cells indicated as target cell candidates in a terminal device specific neighbor relation table, wherein the terminal device specific neighbor relation table is based on the terminal device specific handover parameters, and the terminal device specific neighbor relation table is configured for a determination of whether to utilize the terminal device specific neighbor relation table or a cell specific neighbor relation table in one or more handovers triggered based on said one or more measurement reports, the determination being based upon whether the terminal device is associated with the terminal device specific neighbor relation table.

14. The apparatus of claim 13, further comprising an antenna.

15. A system, comprising one or more base station apparatuses, said one or more base station apparatuses configured to collect handover data correlated with mobility data of a plurality of terminal devices;

determine, based on the collected data, one or more trajectories associated with one or more handover anomalies or failures;

monitor at least one of mobility or cellular connectivity of terminal devices;

detect that a terminal device has or is going to have a trajectory that is determined to be associated with a handover anomaly or failure, determine terminal device specific handover parameters for said terminal device to avoid said handover anomaly or failure;

utilize said terminal device specific handover parameters in one or more handovers associated with the terminal device;

monitor the one or more handovers performed on the basis of said terminal device specific handover parameters;

based on monitoring the one or more handovers performed, and said handover anomaly or failure being avoided by utilizing said terminal device specific handover parameters, store an indication about said terminal device specific handover parameters avoiding said handover anomaly or failure with respect to said trajectory;

create or modify a terminal device specific neighbor relation table based on the terminal device specific handover parameters;

receive of one or more measurement reports from the terminal device;

determine whether the terminal device is associated with a terminal device specific neighbor relation table; and upon determining that the terminal device is associated with the terminal device specific neighbor relation table, utilize said terminal device specific neighbor relation table in one or more handovers triggered based on said one or more measurement reports, otherwise utilize a cell specific neighbor relation table in one or more handovers triggered based on said one or more measurement reports said system further comprising one or more user terminals, said one or more user terminals configured to perform one or more cell measurements;

transmit, based on said one or more cell measurements, one or more measure ment reports to the cellular communication network for determining handover parameters; and utilize terminal device specific handover parameters in one or more handovers associated with the terminal device to avoid a handover anomaly or failure, wherein the terminal device specific handover parameters are determined based on detecting that the terminal device has or is going to have a trajectory that is determined to be associated with the handover anomaly or failure and based on that said terminal device specific handover parameters avoid said handover anomaly or failure with respect to said trajectory.

16. A computer program product embodied on a non-transitory computer-readable medium, said computer program product comprising program instructions which, when loaded into an apparatus, cause the apparatus to execute the steps of collecting handover data correlated with mobility data of a plurality of terminal devices;

determining, based on the collected data, one or more trajectories associated with one or more handover anomalies or failures;

monitoring at least one of mobility or cellular connectivity of terminal devices;

detecting that a terminal device has or is going to have a trajectory that is determined to be associated with a handover anomaly or failure, determining terminal device specific handover parameters for said terminal device to avoid said handover anomaly or failure;

utilizing said terminal device specific handover parameters in one or more handovers associated with the terminal device;

monitoring the one or more handovers performed on the basis of said terminal device specific handover parameters;

based on the monitoring the one or more handovers, and said handover anomaly or failure being avoided by utilizing said terminal device specific handover parameters, storing an indication about said terminal device specific handover parameters avoiding said handover anomaly or failure with respect to said trajectory;

creating or modifying a terminal device specific neighbor relation table based on the terminal device specific handover parameters;

receiving of one or more measurement reports from the terminal device;

determining whether the terminal device is associated with a terminal device specific neighbor relation table; and upon determining that the terminal device is associated with the terminal device specific neighbor relation table, utilizing said terminal device specific neighbor relation table in one or more handovers triggered based on said one or more measurement reports, otherwise utilizing a cell specific neighbor relation table in one or more handovers triggered based on said one or more measurement reports.

17. A computer program product embodied on a non-transitory computer-readable medium, said computer program product comprising program instructions which, when loaded into an apparatus, cause the apparatus to execute the steps of performing one or more cell measurements;

transmitting, based on said one or more cell measurements, one or more measurement reports to a cellular communication network for determining handover parameters;

utilizing terminal device specific handover parameters in one or more handovers associated with a terminal device to avoid a handover anomaly or failure, wherein the terminal device specific handover parameters are determined based on detecting that the terminal device has or is going to have a trajectory that is determined to be associated with the handover anomaly or failure and based on that said terminal device specific handover parameters avoid said handover anomaly or failure with respect to said trajectory; and performing said one or more cell measurements on one or more cells indicated by the cellular communication network, said one or more cells indicated as target cell candidates in a terminal device specific neighbor relation table, wherein the terminal device specific neighbor relation table is based on the terminal device specific handover parameters, and the terminal device specific neighbor relation table is configured for a determination of whether to utilize the terminal device specific neighbor relation table or a cell specific neighbor relation table in one or more handovers triggered based on said one or more measurement reports, the determination being based upon whether the terminal device is associated with the terminal device specific neighbor relation table.

* * * * *